(12) United States Patent
Fuhr et al.

(10) Patent No.: US 11,099,539 B2
(45) Date of Patent: Aug. 24, 2021

(54) MULTI-SENSOR AGENT DEVICES

(71) Applicant: UT-Battelle, LLC, Oak Ridge, TN (US)

(72) Inventors: Peter L. Fuhr, Oak Ridge, TN (US); Marissa E. Morales-Rodriguez, Oak Ridge, TN (US); Sterling S. Rooke, Crofton, MD (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 16/405,855

(22) Filed: May 7, 2019

(65) Prior Publication Data
US 2020/0026253 A1   Jan. 23, 2020

Related U.S. Application Data

(60) Provisional application No. 62/672,823, filed on May 17, 2018.

(51) Int. Cl.
  *G05B 19/042*   (2006.01)
  *G06F 21/60*    (2013.01)
  (Continued)

(52) U.S. Cl.
  CPC ........ *G05B 19/0423* (2013.01); *B64C 39/024* (2013.01); *B64D 47/08* (2013.01);
  (Continued)

(58) Field of Classification Search
  CPC .............. G05B 19/0423; B64C 39/024; B64C 2201/027; B64C 2201/127;
  (Continued)

(56) References Cited

U.S. PATENT DOCUMENTS

| | | | |
|---|---|---|---|
| 6,683,553 B1 * | 1/2004 | Pai | G05B 19/042 341/155 |
| 8,908,573 B1 * | 12/2014 | Wang | H04W 24/08 370/280 |

(Continued)

FOREIGN PATENT DOCUMENTS

CN   105024848 A   11/2015

OTHER PUBLICATIONS

Alex et al., "Autonomous cloud based drone system for disaster response and mitigation," in *Proceedings of IEEE International Conference on Robotics and Automation for Humanitarian Applications*, 2016 (downloaded Aug. 13, 2020; available online.: https://ieeexplore.ieee.org).

(Continued)

*Primary Examiner* — Nicholas R Taylor
*Assistant Examiner* — Chong G Kim
(74) *Attorney, Agent, or Firm* — Kiarqnist Sparkman, LLP

(57) ABSTRACT

Apparatus, methods, and systems implementing multi-sensor agent devices are described herein. The agent devices can each include a plurality of sensors for measuring parameters of interest to an entity such as an electric power utility. The sensors can be organized in individually-IP-addressable sensor clusters, with each sensor cluster including an associated microcontroller. The agent devices can be controlled by a control center of the entity to operate in a coordinated manner, such as to gather and transmit data regarding parameters of interest. The agent devices can be transported to desired areas for data collection by unmanned aerial systems such as drones, and the collected data can be stored in a distributed blockchain ledger.

8 Claims, 17 Drawing Sheets

(51) Int. Cl.
    *B64C 39/02*    (2006.01)
    *B64D 47/08*    (2006.01)
    *H04L 29/06*    (2006.01)

(52) U.S. Cl.
    CPC ...... *G06F 21/602* (2013.01); *B64C 2201/027* (2013.01); *B64C 2201/127* (2013.01); *B64C 2201/128* (2013.01); *H04L 63/0428* (2013.01); *H04L 63/166* (2013.01)

(58) Field of Classification Search
    CPC . B64C 2201/128; B64D 47/08; G06F 21/602; H04L 63/0428; H04L 63/166
    USPC .......................................................... 709/245
    See application file for complete search history.

(56)         References Cited

U.S. PATENT DOCUMENTS

| | | | |
|---|---|---|---|
| 9,615,066 | B1 | 4/2017 | Tran et al. |
| 10,593,109 | B1* | 3/2020 | Floyd ................... G05D 1/0094 |
| 10,713,727 | B1* | 7/2020 | Floyd ..................... G07C 5/085 |
| 2007/0225946 | A1* | 9/2007 | Frank ..................... H04L 67/12 |
| | | | 702/188 |
| 2008/0048872 | A1* | 2/2008 | Frank ................... G01V 5/0083 |
| | | | 340/600 |
| 2009/0236538 | A1* | 9/2009 | Frank ................... G01V 5/0083 |
| | | | 250/394 |
| 2012/0267540 | A1* | 10/2012 | Frank ................... G01V 5/0091 |
| | | | 250/394 |
| 2016/0117853 | A1* | 4/2016 | Zhong ................... B64C 39/024 |
| | | | 345/634 |
| 2016/0232794 | A1* | 8/2016 | Hafeez ................. G08G 5/0043 |
| 2017/0029107 | A1* | 2/2017 | Emami ................ G08G 5/0078 |
| 2017/0285595 | A1 | 10/2017 | Wenus et al. |
| 2017/0302511 | A1 | 10/2017 | Foster et al. |
| 2018/0074488 | A1* | 3/2018 | Cantrell ........... G06Q 10/06311 |
| 2018/0124184 | A1 | 5/2018 | Champion et al. |
| 2018/0229684 | A1* | 8/2018 | Anvari .................. B60R 21/233 |
| 2018/0306609 | A1* | 10/2018 | Agarwal .................. H04W 4/38 |
| 2018/0342036 | A1* | 11/2018 | Zachary ................ H04L 9/0637 |
| 2020/0153562 | A1* | 5/2020 | Liu ........................ H04L 1/1858 |
| 2020/0191556 | A1* | 6/2020 | Jia .......................... H04N 5/225 |

OTHER PUBLICATIONS

Bello et al., "Satellite remote sensing as a tool in disaster management and sustainable development: towards a synergistic approach," *Procedia-Social and Behavioral Sciences*, vol. 120, pp. 365-373 (2014).

"Brixon Licenses Sensor Technology From ORNL," *Photonics Media*, pp. 1-3, Dec. 2018 (downloaded https://www.photonics.com/Articles/Brixon_Licenses_Sensor_Technology_From_O_RNL/a63979 on Mar. 6, 2020).

Han et al., "Convergence of Sensor Networks/Internet of Things and Power Grid Information Network at Aggregation Layer," *2010 International Conference on Power System Technology*, pp. 1-6, (2010).

Li et al., "The Applications of WiFi-based Wireless Sensor Network in Internet of Things and Smart Grid," *2011 6th IEEE Conference on Industrial Electronics and Applications*, pp. 789-793 (2011).

Morales-Rodriguez et al., "Secure Unmanned Aerial Systems (Drones) in Automation," *Drones in Automation*, pp. 1-18 (Accepted Apr. 2017, Published May 1, 2017) (Available online: https://www.isa.org.) [also published as Morales-Rodriguez et al., "Drones in automation—Secured unmanned aerial systems" *Intech Magazine*, vol. 17, issue 3, (May 2017), Abstract only, 3 pages].

Seay, "Smart grid goals: ORNL, Chattanooga EPB test sensors to enhance electricity grid resiliency, security" *Oak Ridge National Laboratory*, Feb. 2018 (Available online: https://www.ornl.gov).

Van Westen, "Remote Sensing for Natural Disaster Management," *International Archives of Photogrammetry and Remote Sensing*, vol. XXXIII, Part B7, pp. 1609-1617 (2000).

Yun et al., "Research on the Architecture and Key Technology of Internet of Things (IoT) Applied on Smart Grid," *2010 International Conference on Advances in Energy Engineering*, pp. 69-72 (2010).

* cited by examiner

MULTI-SENSOR AGENT DEVICES

CROSS REFERENCE TO RELATED APPLICATION

This application claims the benefit of U.S. Provisional Patent Application No. 62/672,823, filed May 17, 2018 and titled "INTERNET OF THINGS MULTIPARAMETER SENSOR AGENT OUTSTATION," which is incorporated herein by reference in its entirety.

ACKNOWLEDGMENT OF GOVERNMENT SUPPORT

This invention was made with government support under Contract No. DE-AC05-00OR22725 awarded by the U.S. Department of Energy. The government has certain rights in the invention.

BACKGROUND

Energy infrastructures such as electrical power grids are typically driven by multi-level control systems that observe the state of the systems and respond to attain a local stable operating point. For example, supervisory control and data acquisition (SCADA) systems perform vital functions in energy generation, transmission, and end-use. However, the integration of networked control systems with other networks has made them vulnerable to various disruptions, malicious attacks, and cyber threats. For example, communications networks and software applications are often used by electric power utilities to maintain electricity generation within limits to meet demand. However, communications networks and software applications are vulnerable to cyber-attacks, and attackers have demonstrated an ability to disable critical controllers and create a highly disruptive electrical blackout. Prolonged failure of critical systems in electrical power grids, water/wastewater, public health, transportation, banking, and industry could halt economic activity, create mayhem, and proliferate life-threatening safety hazards. Accordingly, there exists a need to develop a secure and resilient monitoring system that protects infrastructure system assets and critical functions and can help those system assets and critical functions withstand, and recover rapidly from, disruptions.

SUMMARY

Examples described herein relate to multi-sensor agent devices each including one or more individually-IP-addressable sensor clusters, a communications module, and a power supply. Each of the respective one or more sensor clusters can include a microcontroller and one or more sensors communicatively coupled with the microcontroller. The communications module of each agent device is communicatively coupled with the microcontroller of each of the respective one or more sensor clusters and configured to convey network management protocol queries from a control center to the microcontroller of that sensor cluster via a logical channel from among a first set of logical channels. Further, for each of the respective one or more sensor clusters, the communications module is configured to output data generated by the one or more sensors of that sensor cluster via a logical channel from among a second set of logical channels to the control center, the second set of logical channels being different from the first set of logical channels. The power supply is electrically coupled with the communications module, as well as with the microcontroller for each of the respective sensor clusters. The agent devices can alternatively be referred to as multi-sensor agent platforms, and can be mobile or stationary.

In some examples, an entity such as a control center of an infrastructure system can establish communication with one or more deployed multi-sensor agent devices, and send signals to the deployed agent device(s). The signals can identify at least one sensor type of interest and cause activation of one or more sensors associated with the at least one sensor type of interest. The control center can then receive data collected by the activated sensors, e.g., in the form of an update to a distributed blockchain ledger.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the invention will become more apparent from the following detailed description, which proceeds with reference to the accompanying figures.

DETAILED DESCRIPTION

Using the apparatus, methods, and systems described herein, multi-sensor agent devices can be implemented and deployed by entities such as electric power utilities. The agent devices can include sensors for measuring parameters of interest to the entity, and the sensors can be organized in individually-IP-addressable sensor clusters. Each sensor cluster can include an associated microcontroller interfacing with the sensors.

A control center of the entity can control the agent devices as a "botnet," such that they operate in a coordinated manner to gather and transmit data regarding parameters of interest. This can include the control center sending signals to the deployed agent devices that identify at least one sensor type of interest and cause activation of one or more sensors associated with the at least one sensor type of interest, and then receiving data collected by the activated sensors. In some examples, the agent devices are transported to desired areas for data collection by unmanned aerial systems such as drones. A ledger, such as a distributed blockchain ledger, can be used to record data generated by the activated sensors to provide a record of measurements for parameters of interest.

I. Example Environment for Agent Devices

Figure 1:
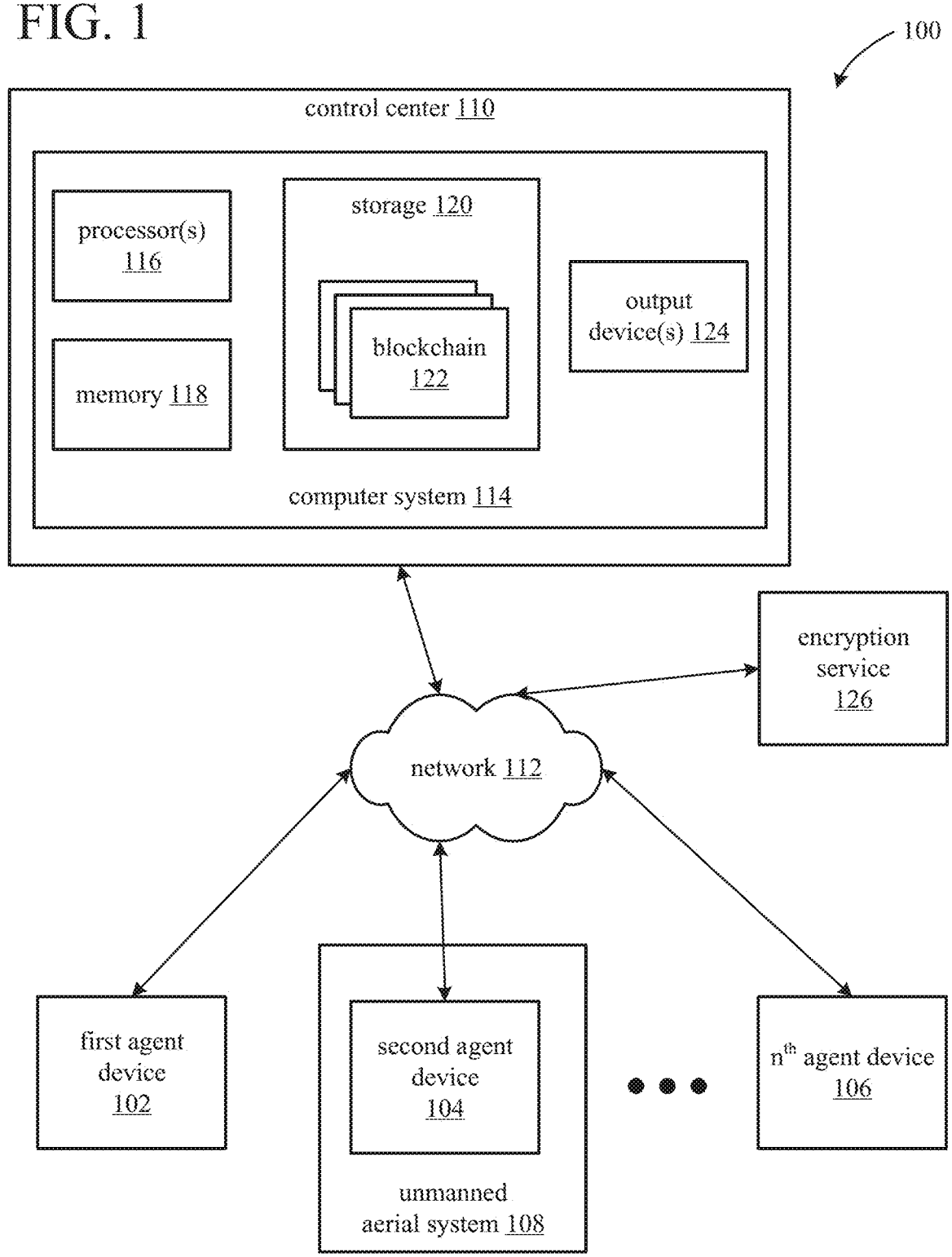
FIG. 1 is a block diagram of an example environment in which multiple agent devices can be implemented.

FIG. 1 illustrates an example environment 100 in which one or more agent devices can be implemented along with a control center and an encryption service. Environment 100 includes a first agent device 102, a second agent device 104, and an $n^{th}$ agent device 106; the ellipsis mark indicates that some number of additional agent devices, which are not shown, can also be present in environment 100. While environment 100 includes some number n of agent devices in the depicted example, it is contemplated that the environment can instead include a single agent device or only two agent devices. An example agent device is discussed in detail below with respect to FIG. 2.

In the depicted example, second agent device 104 is included on an unmanned aerial system (UAS) 108 (e.g., a drone or unmanned aerial vehicle). In other examples, none, more than one but less than all, or all of the agent devices are included on UASs in environment 100. Alternatively, one or more of the agent devices can be included on another type of vehicle (e.g., an unmanned or manned vehicle that travels on the ground, underground, over water, or underwater, or a manned aerial vehicle). In some examples, an agent device can be both physically and logically connected with a UAS or other transport device. For example, the one or more sensor cluster microcontrollers of the agent device can communicate with a controller of the UAS or transport device.

In examples where an agent device is included on a UAS, the agent device can be carried onboard the UAS (as opposed to being structurally integrated with the UAS in a non-detachable manner). In such examples, the agent device can be transported by the UAS to a specified location, and deposited by the UAS to monitor environmental parameters at the location. In another example, however, the agent device can remain onboard the UAS upon arriving at the location, with both the UAS and the agent device remaining at the location while the agent device monitors environmental parameters at the location. In such an example, the agent device can optionally be structurally integrated with the UAS in a non-detachable manner (e.g., such that the agent device itself is a UAS).

In environment 100, agent devices 102, 104, and 106 are in communication with a control center 110 over a network 112. While a single control center 110 is depicted in environment 100, the environment can alternatively include one or more additional control centers or other control entities. In some examples, control center 110 is a control center of a utility such as an electric power utility. Network 112 can be the Internet, a Local Area Network (LAN), a Wireless Local Area Network (WLAN), a Wide Area Network (WAN), or other type of network, wired or wireless.

Control center 110 includes one or computer systems such as a computer system 114. In some examples, computer system 114 is a SCADA system of a utility, or is part of a SCADA system. In the depicted example, computer system 114 includes processor(s) 116, memory 118, local storage 120 storing one or more blockchains such as a blockchain 122, and output device(s) 124. Processor(s) 116 can include processing cores of a central processing unit ("CPU"), which are configured to execute computer-executable instructions, or other types of processing units. As discussed further below, computer system 114 can incorporate and utilize cybersecurity tools such as a cyber intrusion detection system (IDS), a cyber intrusion protection systems (IPS), or cyber Unified Threat Manager (UTM). This can include the computer system sending queries such as network management protocol queries to the agent devices, including to individually-addressable sensor clusters of the agent devices, and receiving responses to the queries from the individually-addressable sensor clusters of the agent devices.

More generally, the term "processor" may refer generically to any device that can process computer-executable instructions and may include a microprocessor, microcontroller, programmable logic device, digital signal processor, and/or other computational device. A processor may be a CPU or other general-purpose unit, however, it is also known to provide a specific-purpose processor using, for example, an ASIC or a field-programmable gate array ("FPGA").

The term "control logic" may refer to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

Memory 118 can include volatile memory (e.g., registers, cache, RAM), non-volatile memory (e.g., ROM, EEPROM, flash memory, etc.), or some combination of the two, accessible by processor(s) 116. Local storage 120 can include non-volatile memory (e.g., ROM, EEPROM, flash memory, etc.) accessible by processor(s) 116. As discussed further below, local storage 120 stores one or more blockchains 122, such as a blockchain ledger storing data generated by sensors of the agent devices. Local storage 120 can be removable or non-removable, and can include magnetic media (such as magnetic disks, magnetic tapes or cassettes), optical disk media and/or any other media which can be used to store information and which can be accessed within the computer system. In addition, memory 118 and/or local storage 120 can include software used to communicate with, control, and receive data from the agent devices and encryption service.

In addition to the components shown in FIG. 1, computer system 114 can also include one or more network adapters. As used herein, the term network adapter indicates any network interface card ("NIC"), network interface, network interface controller, or network interface device. The network adapter(s) can enable communication between the control center, the agent devices, and the encryption service over network 112. The network can be a telephone network, wide area network, local area network, storage area network, or other network. The network adapter(s) can support wired connections and/or wireless connections, for a telephone network, wide area network, local area network, storage area network, or other network. In some examples, the network adapter(s) convey data (such as computer-executable instructions, speech/audio or video input or output, or other data) in a modulated data signal over network connection(s).

A modulated data signal is a signal that has one or more of its characteristics set or changed in such a manner as to encode information in the signal. By way of example, and not limitation, the network connections can use an electrical, optical, RF, or other carrier.

The computer system can also include one or more input device(s) (not shown). The input device(s) can be a touch input device such as a keyboard, mouse, pen, or trackball, a scanning device, or another device that provides input to the computer system. For speech/audio input, the input device(s) can include one or more microphones. The computer system can also include a video input, another audio input, and/or a motion sensor/tracker input.

In addition, the computer system can include one or more output devices 124, such as a display. For speech/audio output, the output device(s) can include one or more speakers. The output device(s) can also include a printer, CD-writer, video output, another audio output, or another device that provides output from computer system 114.

An interconnection mechanism (not shown) such as a bus, controller, or network interconnects the components of computer system 114. Typically, operating system software (not shown) provides an operating environment for other software executing in the computer system, and coordinates activities of the components of the computer system.

The term "application" or "program" may refer to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples are not limited to any specific combination of hardware and software.

The term "computer-readable medium" refers to any medium that participates in providing data (e.g., instructions) that may be read by a processor and accessed within a computing environment. A computer-readable medium may take many forms, including but not limited to non-volatile media and volatile media. Non-volatile media include, for example, optical or magnetic disks and other persistent memory. Volatile media include dynamic random access memory ("DRAM"). Common forms of computer-readable media include, for example, a solid state drive, a flash drive, a hard disk, any other magnetic medium, a CD-ROM, Digital Versatile Disc ("DVD"), any other optical medium, RAM, programmable read-only memory ("PROM"), erasable programmable read-only memory ("EPROM"), a USB memory stick, any other memory chip or cartridge, or any other medium from which a computer can read. The term "computer-readable memory" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

Environment 100 further includes encryption service 126, which can be implemented by software and used to create and manage encryption keys. In the depicted example, encryption service 126 is shown as being external to and separate from the control center and the agent devices, and communicates with the control center and agent devices over network 112. In other examples, however, encryption service 126 can be implemented by control center 110 (e.g., by computer system 114) and/or by one or more of the agent devices. As discussed further below, software implementing aspects of a blockchain ledger for sensor updates can use (e.g., make a call to) the encryption service to receive a key to encrypt a ledger update or receive a key to decrypt a ledger update received (in encrypted form) from an agent device, and the encrypted ledger update can be used to update a blockchain (e.g., blockchain 122 stored in local storage 120 of computer system 114).

II. Example Agent Device

Figure 2:
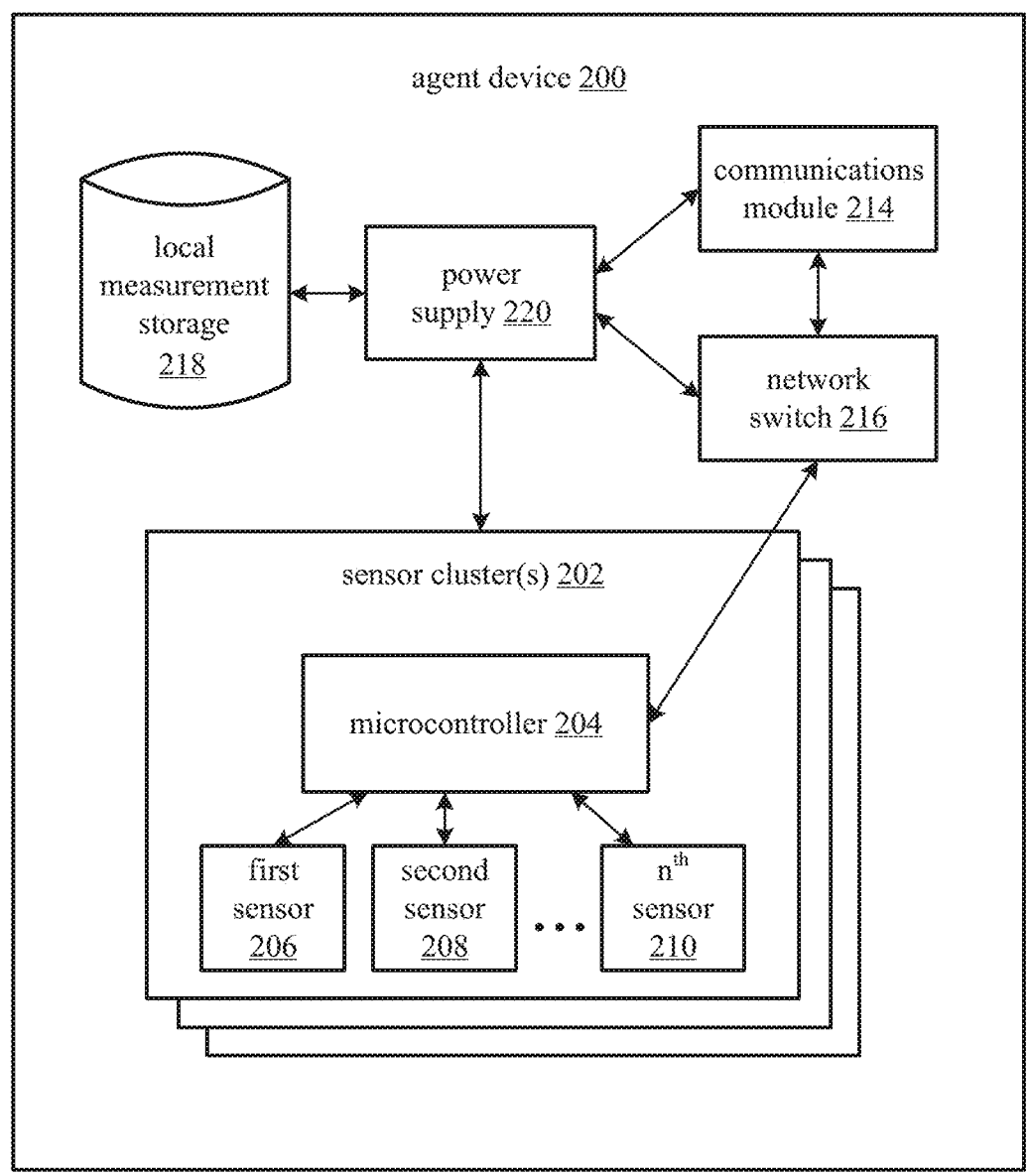
FIG. 2 is a block diagram of an example agent device.

FIG. 2 illustrates an example agent device 200, which can correspond to agent device 102, 104, and/or 106 of FIG. 1. Agent device 200 can alternatively be referred to as a "multi-sensor field agent," a "multi-sensor field agent," or just a "field agent." As detailed herein, agent device 200 can include one or more sensor clusters 202 measuring various parameters (e.g., temperature, irradiance, chemicals, RF radiation, and/or specific parameters associated with electric grid elements, devices, and systems), depending on the particular combination of sensors in the sensor cluster(s) of the agent device.

Each sensor cluster 202 includes a microcontroller 204, a first sensor 206, a second sensor 208, and an $n^{th}$ sensor 210; the ellipsis mark indicates that some number of additional sensors, which are not shown, can also be included in the sensor cluster. While sensor cluster 202 includes some number n of sensors in the depicted example, it is contemplated that the sensor cluster can instead include a single sensor or only two sensors.

The sensors are configured to obtain data on parameters associated with the monitoring of an electrical grid, including the extended grid state, or other environment. These parameters can include electrical parameters, topological parameters, component parameters, ambient parameters, and network parameters. The physical sensors can operate with dual functionality by monitoring a specific suite of physical parameters while also providing network communication information to a control center such as an information technology (IT) security system of the electrical power utility.

In particular, the sensed parameters can include temperature, humidity, atmospheric pressure, acceleration, motion, magnetism, radiation (y), coronal arc discharge, thermal imagery, visual imagery, presence/concentration of chemicals such as methane ($CH_4$), hydrogen ($H_2$), carbon monoxide (CO), carbon dioxide ($CO_2$), and nitrous oxide ($N_2O$), volatile organic compounds (VOCs), alcohol (e.g., alcohol vapor), fluorinated gases, chemical fields, acoustic fields, particulates, solar irradiance, vibrations, radio frequencies, wind, voltage, current, frequency, phase angle, etc. The agent device can also include sensors that provide physical and cybersecurity situational awareness by measuring and monitoring parameters such as cellphone signals, the presence of drones, sensor network cyber intrusion, and physical intrusion. This list of sensed parameters is provided for the sake of example, and is not meant to be limiting.

The sensors of agent device 200 can operate according to variable data acquisition sampling rates and volume, as needed for customizing grid operations and enhancing cyber-physical security. In addition, the design of the agent device can be modular and can accommodate conventional, commercially-available sensors as well as lightweight printed sensors or other customized sensing devices. Using lightweight sensors can facilitate use of the agent device in combination with UASs for real-time surveillance of the physical health state of an electric power grid or other environment. Accordingly, agent device 200 itself can be viewed as a cyber-physical sensor that will perceive and react to its environment, responding in a timely manner.

In general, a microcontroller 204 is a miniaturized computer system, e.g., on an integrated circuit, including one or more processing cores and memory. Typically, a microcontroller 204 also includes logic for controlling peripheral devices, e.g., sensors 206, 208, 210). As discussed further below with respect to FIG. 3, microcontroller 204 can include one or more processing cores and an on-chip memory, and can be assigned a unique IP address. In some examples, microcontroller 204 is a Raspberry Pi (RPi) device such as an RPi 3.

Microcontroller 204 is communicatively coupled with each of sensors 206, 208, and 210. That is, the microcontroller 204 can, directly or indirectly, transmit/receive communication signals to/from each of the sensors 206, 208, and 210. The coupling between the microcontroller and the sensors can be implemented via auxiliary circuitry, via direct connection into a sensor interface of the microcontroller, as discussed further below with respect to FIG. 3, or via some other mechanism.

Microcontroller 204 can include software which allows the associated sensor cluster of the agent device to perform various functions. Accordingly, the agent devices can alternatively be referred to as hardware/software (HW/SW) agents. The software can be stored in the on-chip memory of the sensor cluster microcontrollers, for example. As discussed further below, the functions performed by the agent device using the software can include gathering and reporting sensor readings, updating a ledger such as a blockchain distributed ledger with sensor readings, using a blockchain distributed ledger for validation of device authenticity, and providing responses (e.g., ICMP responses, SNMP responses, etc.) to probe signals/commands/queries issued by various cybersecurity tools at a control center. For example, software architectures used by electric power utilities often include cybersecurity tools such as the IDS, IPS, and UTM tools discussed above with respect to FIG. 1.

Agent device 200 further includes a communications module 214, which can implement wireless (e.g., radiofrequency (RF) communication such as Wi-Fi communication), optical communication (e.g., fiber optic communication), or wired communication. For example, the communications module can be implemented by or include a MikroTik 900 MHz Wi-Fi networking device. In examples where the communication module enacts RF communication, it can include components such as an RF transceiver and an antenna. However, communications module 214 can implement other types of communication without departing from the scope of this disclosure. For example, the communications module 214 can include a network adapter as described with reference to FIG. 1. Communication between the agent device and other agent devices, a computer system of a control center, etc., can occur via communications module 214 in conjunction with a network switch 216 communicatively coupled therewith. Network switch 216 can be configured to connect the components of the agent device with the control center and/or other agent devices. For example, the network switch can use packet switching to receive and forward data between the respective sensor cluster(s) 202 and communications module 214. Network switch 216 can be an Ethernet switch, or another type of switch. Accordingly, intercommunication of multiple agent devices operating in a coordinated manner can be provided via respective communications modules and network switches of the agent devices.

Communications module 214 and network switch 216 can also facilitate communications between the agent device and a control center of a utility, such as control center 110 of FIG. 1, or another entity. The communications can include, for example, network management protocol queries; responses to network management protocol queries; commands to activate/deactivate particular sensors, types of sensors, or clusters of sensors; and communications providing data such as sensor readings generated at the agent device to an external entity such as a control center. In examples where the control center is a control center for an electric power utility, communication between the agent device and the control center can occur using the Distributed Network Protocol 3 (DNP3), which is a set of communications protocols used between components in process automation systems such as distribution and substation automation systems, or by another protocol.

The respective sensor clusters 202 can be considered "cyberaware" in the context of their responses to queries issued by the control center. As discussed above with respect to FIG. 1, the control center can include software systems for providing network security, such as IDS, IPS, and UTM systems. These systems can be included as part of a SCADA system of the control center, or can alternatively be implemented separately from the SCADA system. Upon deployment within a service area of a utility, using the associated communication backbone fabric, agent devices can be identified and registered in an authorized device database of a UTM system. All communication traffic to and from the agent devices can be encrypted. In addition, each communication transport mechanism—e.g., wired (within a sensor cluster), 900 MHz wireless, and fiber optic—can rely on Ethernet security, while operating on a specific Virtual Local Area Network (VLAN) that segregates all agent device sensor traffic from other SCADA data flow within the core network. This combination of cyberaware sensors, UTM responses, authorized device listing, and encryption can provide for a cybersecure system.

Agent device 200 further includes local measurement storage 218. Local measurement storage 218 can include volatile memory (e.g., registers, cache, RAM), non-volatile memory (e.g., ROM, EEPROM, flash memory, etc.), or some combination of the two, accessible by the sensor cluster microcontrollers. Local measurement storage 218 can be removable or non-removable, and can include magnetic media (such as magnetic disks, magnetic tapes or cassettes), optical disk media and/or any other media which can be used to store information and which can be accessed within the agent device 200. In some examples, local measurement storage 218 includes software used to communicate with, control, and receive data from sensor cluster(s) 202.

Electric power is supplied to the various components of the agent device via a power supply 220. That is, the power supply 220 is electrically coupled to the various components of the agent device. In turn, power supply 220 can receive power from external power sources, such as mains electric power, solar power sources, batteries, etc. Power supply 220 can provide DC power to at least some of the hardware elements of the agent device. In one example, power supply 220 can include an AC-to-DC power converter module, which can be configured to convert AC power received from an external power source to DC power to be supplied to hardware elements of the agent device.

Different styles of enclosures for the agent device can be used without departing from the scope of this disclosure. In some examples, a single agent device, which in turn includes one or more sensor clusters, can be packaged within a single enclosure. In other examples, multiple agent devices can be packaged within a single enclosure, with each agent device including one or more sensor clusters. An enclosure for one or more agent devices can alternatively be referred to as an "outstation," "outstation agent," or "outstation device." The enclosures can be configured to be attached to and flown on UASs such as drones; e.g., the enclosures can include design features tailored for attachment to UASs. In other examples, a UAS itself can serve as an enclosure for one or more agent devices. In examples where an agent device is flown on an unmanned aerial vehicle, the agent device can be used to perform functions such as inspection of electric utility pole-mounted transformers, ancillary grid infrastructure components, or other devices that would otherwise be difficult to inspect. In one non-limiting example, the enclosure can be a rugged, weatherproof National Electrical Manufacturers Association (NEMA) enclosure.

The design of each agent device 200 can allow for a programmable frequency of data acquisition and volume, which can improve operations of an entity associated with the control center, such as a utility, and can enhance cyber-physical security. In addition, the design can be modular and can accommodate conventional, commercially-available sensors as well as lightweight printed sensors. Accordingly, the agent devices can be used in combination with UASs for real-time surveillance of the physical health state of an infrastructure system such as an electrical grid.

The agent devices can be designed to conform to the principles of the Internet of Things (IoT), by which discrete devices and appliances are equipped with sensors and other hardware that enable them to interact with each other over the internet. For example, the agent devices include computing devices which can be embedded in objects (e.g., substations), which send and receive data over the Internet. More particularly, the agent devices can be characterized as Industrial IoT devices in examples where they operate in automation or electric utility settings.

III. Example Sensor Cluster Microcontroller

Figure 3:
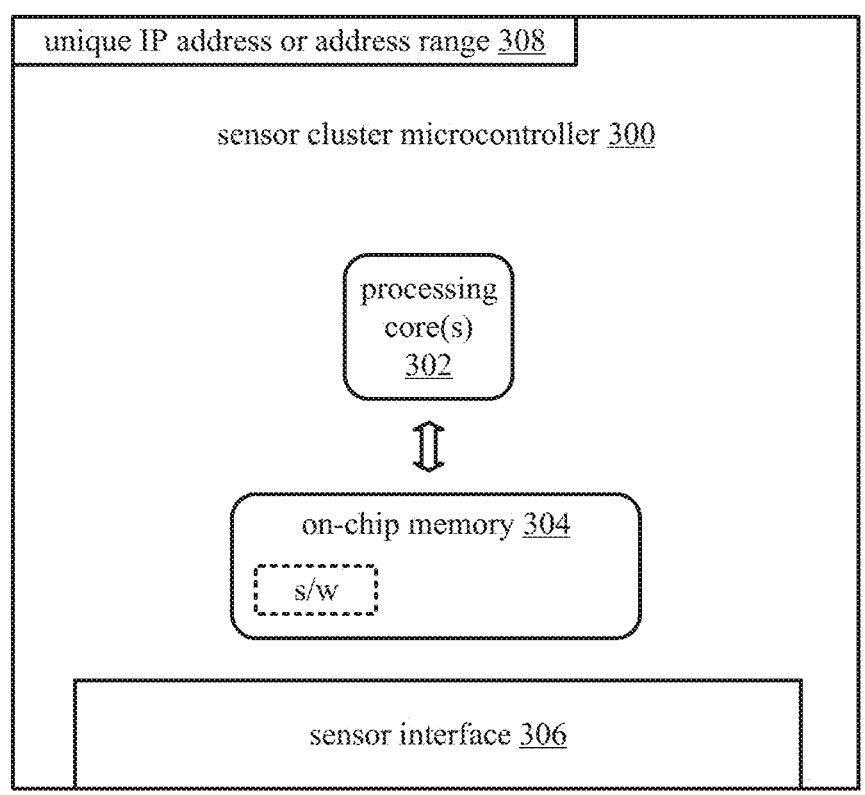
FIG. 3 is a block diagram of an example sensor cluster microcontroller.

FIG. 3 illustrates an example sensor cluster microcontroller 300, which can correspond to microcontroller 204 of FIG. 2. In some example configurations, each sensor cluster of an agent device (e.g., agent device 200 of FIG. 2) can include a sensor cluster microcontroller 300. The sensor cluster microcontroller can include an operating system (OS) and components for networking, signal processing, and power management. In the depicted example, sensor cluster microcontroller 300 includes one or more processing cores 302. An on-chip memory 304 is communicatively coupled with processing core(s) 302. As shown, on-chip memory 304 optionally includes software (s/w).

Sensor cluster microcontroller 300 further includes one or more peripheral interfaces such a sensor interface 306. Sensor interface 306 can be an analog-to-digital (A/D) interface, a USB interface, an I²C interface, or a serial interface, for example. In other examples, the sensors of the sensor cluster are communicatively coupled with the sensor cluster microcontroller via auxiliary circuitry, or via Wi-Fi, as opposed to via a dedicated sensor interface. In such examples, one or more of the individual sensors can be IP-addressable. In examples where sensor cluster microcontroller 300 is implemented as an RPi3 device, interface options for the sensors can include direct connection into the auxiliary circuitry of the RPi3 device or direct connection to the A/D, USB, or I²C interfaces of the RPi3 device. The manner of communicative coupling with the sensor cluster microcontroller can vary among the sensors, depending on the particular types of sensors and any communications-related components they may individually include. The sensor cluster microcontroller 300 can also be communicatively coupled (e.g., through a network switch) with a communications module, through which the microcontroller 300 can communicate with a control center or other entity via one or more logical channels.

Sensor cluster microcontroller 300 can itself be individually-IP-addressable, having a unique IP address assigned to it, or having a range of IP addresses 308 assigned to it with at least one IP address in the range being used by the microcontroller 300 and one or more other IP addresses in the range being used by individual sensors of the sensor cluster. For example, the unique IP address or address range for a sensor cluster microcontroller of an agent device can be selected and assigned by a network engineer for a network over which the agent device will communicate. The IP addresses can be assigned dynamically, e.g. using the Dynamic Host Configuration Protocol (DHCP), or as static addresses.

IV. Example Blockchain Sensor Authentication and Measurement Validation

Figure 4:
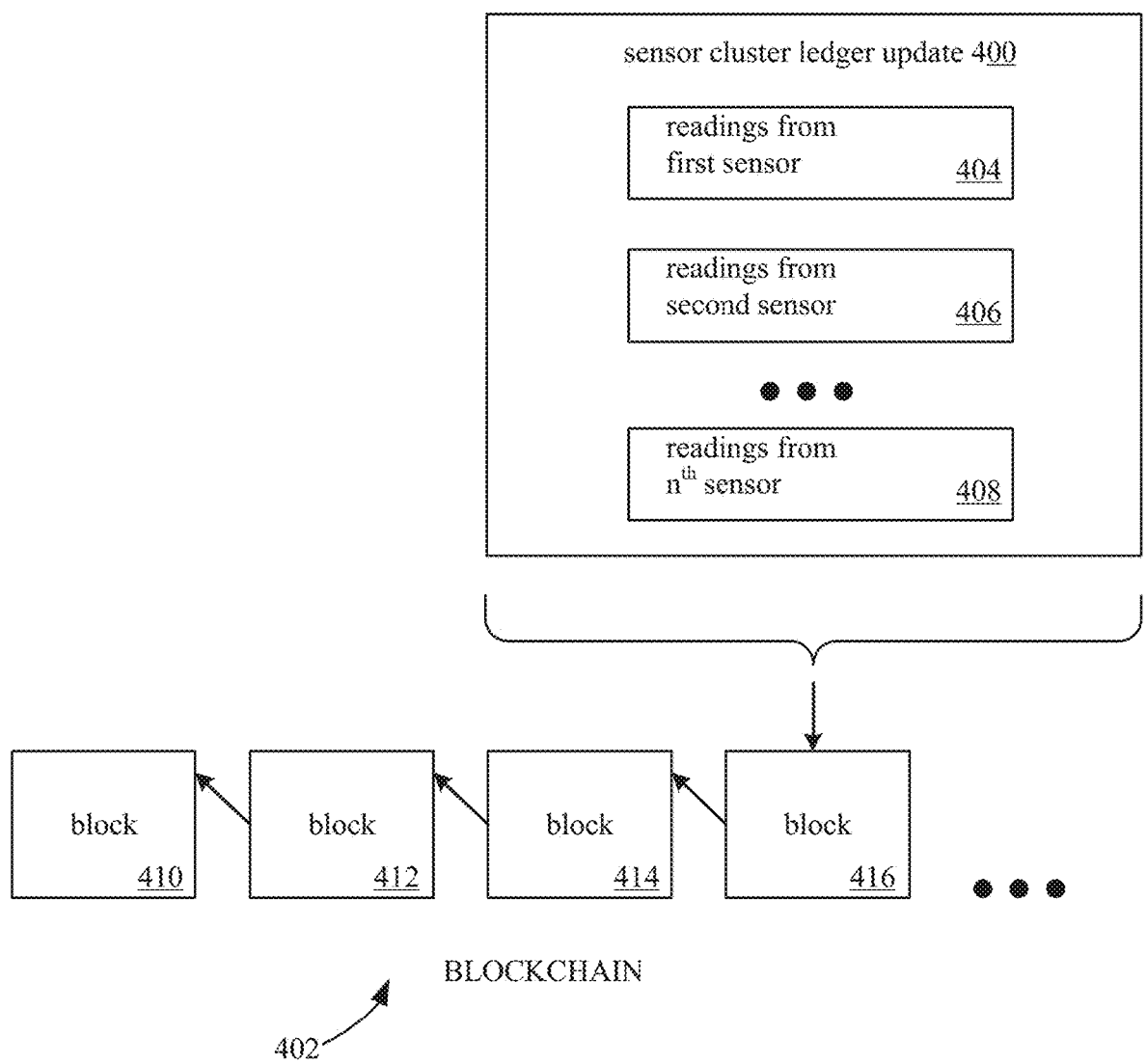
FIG. 4 is block diagram of an example sensor cluster ledger update to a blockchain ledger.

FIG. 4 shows an example sensor cluster ledger update 400 to a blockchain 402. Update 400 is generated by a sensor cluster of an agent device, such as sensor cluster 202 of FIG. 2. For example, update 400 can be generated by a sensor cluster microcontroller, such as microcontroller 204 of FIG. 2, using readings from one or more sensors coupled thereto (e.g., sensors 206, 208, and/or 208 of FIG. 2).

In the depicted example, update 400 includes readings from a first sensor 404, readings from a second sensor 406, and readings from an $n^{th}$ sensor. The ellipsis mark indicates that readings from some number of additional sensors, which are not shown, can also be included in update 400. In some examples, the control center can send a command to one or more associated agent devices that causes certain sensor clusters, or certain sensors within sensor clusters, to generate updates containing readings of specified sensors or sensor types, as discussed further below with respect to FIG. 10.

Update 400 is stored as a block in blockchain 402. Blocks 410, 412, 414, and 416 of blockchain 408 are shown in FIG. 4, but any number of blocks can form blockchain 408. As indicated by the arrows between blocks 410, 412, 414, and 416, the respective blocks are logically linked to the previous block in the blockchain. This link can be in the form of, for example, a hash of the previous block.

In FIG. 4, sensor data from multiple types of sensors of a sensor cluster is stored in the same blockchain. Alternatively, sensor data from different types of sensors can be stored in different blockchains. Sensor data from different sensor clusters of a given agent device can be stored in the same blockchain or different blockchains (e.g., associated with the respective sensor clusters of the agent device). Sensor data from different agent devices can be stored in the same blockchain or different blockchains (e.g., associated with the respective agent devices, or with respective types of sensor clusters, or with respective types of sensors).

V. Example Communications Between an Agent Device and a Control Center

Figure 5:
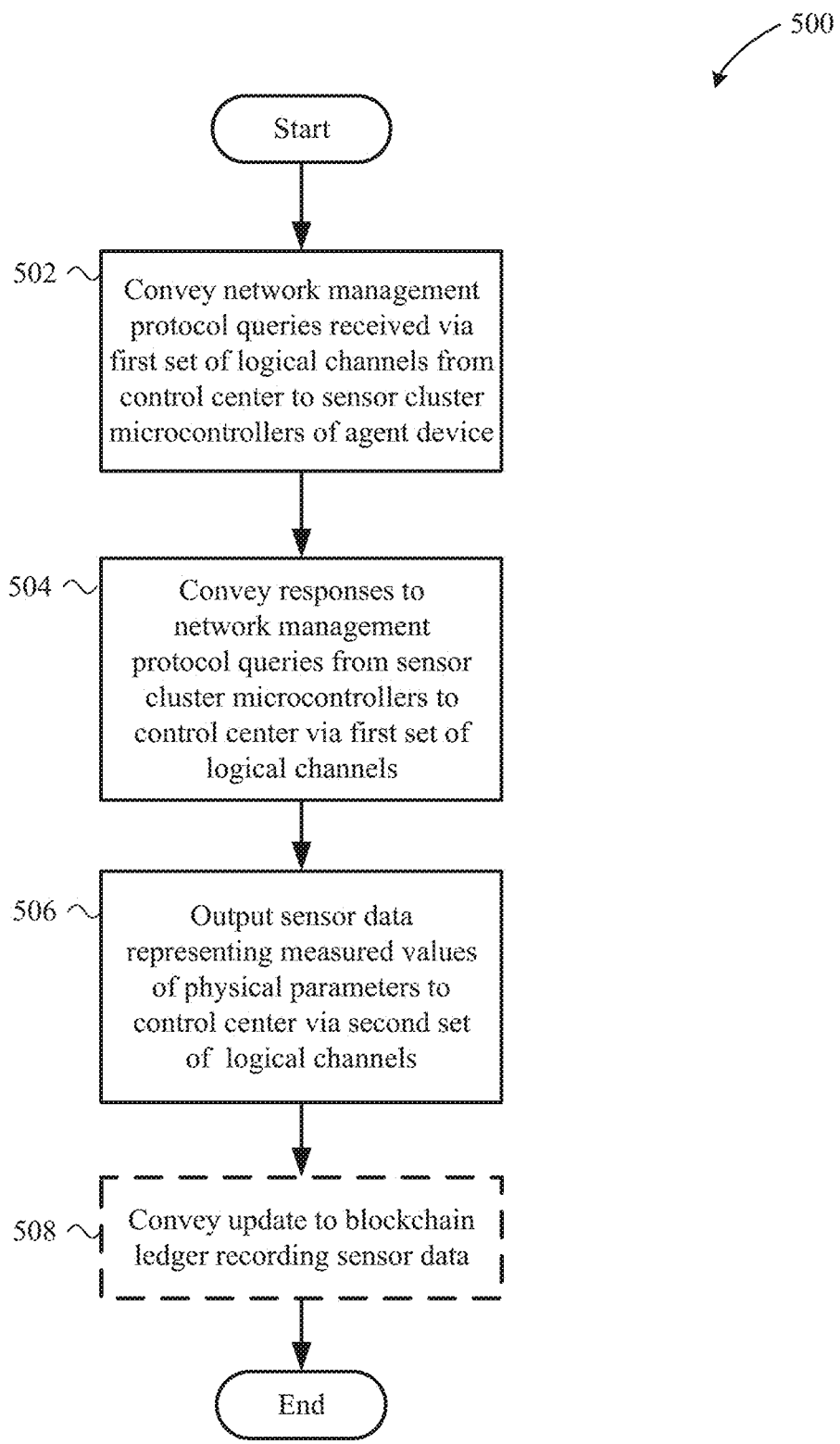
FIG. 5 is a diagram illustrating an example method of communication between an agent device and a control center.

FIG. 5 illustrates a method 500 of communication between an agent device and a control center. In process block 502, network management protocol queries received from a control center via a first set of logical channels are conveyed to one or more sensor cluster microcontrollers of an agent device. Each of the one or more sensor cluster microcontrollers can use a different logical channel among the first set of logical channels, or the respective sensor cluster microcontroller(s) can share a first logical channel, or a given sensor cluster microcontroller can use different logical channels among the first set of logical channels for different types of communications or communications with different control centers. The network management protocol queries can be ICMP or SNMP queries, for example, such as ICMP echo request queries. A given logical channel among the first set of logical channels can be established using a sockets application programming interface (API) or other mechanism. The logical channel can be established over a dedicated wireless channel. For example, the logical channel can be configured to transport data in accordance with the Transport Control Protocol (TCP) or other connection-oriented transport protocol, with routing according to a version of Internet Protocol (IP), over a dedicated wireless channel or other dedicated physical channel. Alternatively, the logical channel among the first set of logical channels can represent a particular stream of network traffic (e.g., packets) multiplexed over a non-dedicated wireless channel. For example, the logical channel can be configured to transport data via a logically distinct channel in accordance with TCP, with routing according to a version of IP, over a wireless channel or other physical channel that is shared with one or more other logical channels.

In process block 504, responses to network management protocol queries are conveyed from the one or more sensor cluster microcontrollers to the control center via the first set of logical channels. The responses can include, for example, ICMP echo replies. Alternatively, such responses can be conveyed over a different set of logical channels.

In process block 506, sensor data representing measured values of physical parameters is output from the agent device to the control center via a second set of logical channels. A given logical channel among the second set of logical channels can be established using a sockets API or other mechanism. The logical channel can be established over a dedicated physical channel or shared physical channel. For example, in contrast to the first set of logical channels, a given logical channel among the second set of logical channels can transport data in accordance with a User Datagram Protocol (UDP) or other connection-less, best-efforts transport protocol, with routing according to a version of IP, over a wireless channel or other physical channel. Further, the second set of logical channels can be associated with a SCADA system of the control center. The first and second sets of logical channels can also be distinct physical channels from one another (e.g., separate wireless channels which do not share network traffic). Alternatively, the first set of logical channels can represent first streams of network traffic, and the second set of logical channels can represent second streams of network traffic, multiplexed over a non-dedicated (shared) wireless channel, such as a wireless channel that multiplexes traffic associated with both of the first and second sets of logical channels (and optionally, other logical channels). In some example configurations, different sensor cluster microcontrollers establish different logical channels among the second set of logical channels, in order to transmit sensor data. Alternatively, a given sensor cluster microcontroller can use different logical channels, among the second set of logical channels, to convey sensor data from different sensors. Or, different sensor cluster microcontrollers can share a second logical channel.

Traffic over any of the respective logical channels can be conveyed in encrypted form, using encryption keys provided by an encryption service to encrypt and decrypt data. Encryption can, in effect, make a logical channel private between a sensor cluster microcontroller and control center.

Optionally, as shown in process block 508, the sensor data output by the one or more sensor cluster microcontrollers of an agent device is further conveyed, at the control center, as an update to a blockchain ledger recording sensor data. Blockchain ledger updates are discussed in further detail below with respect to FIG. 10.

Figure 6:
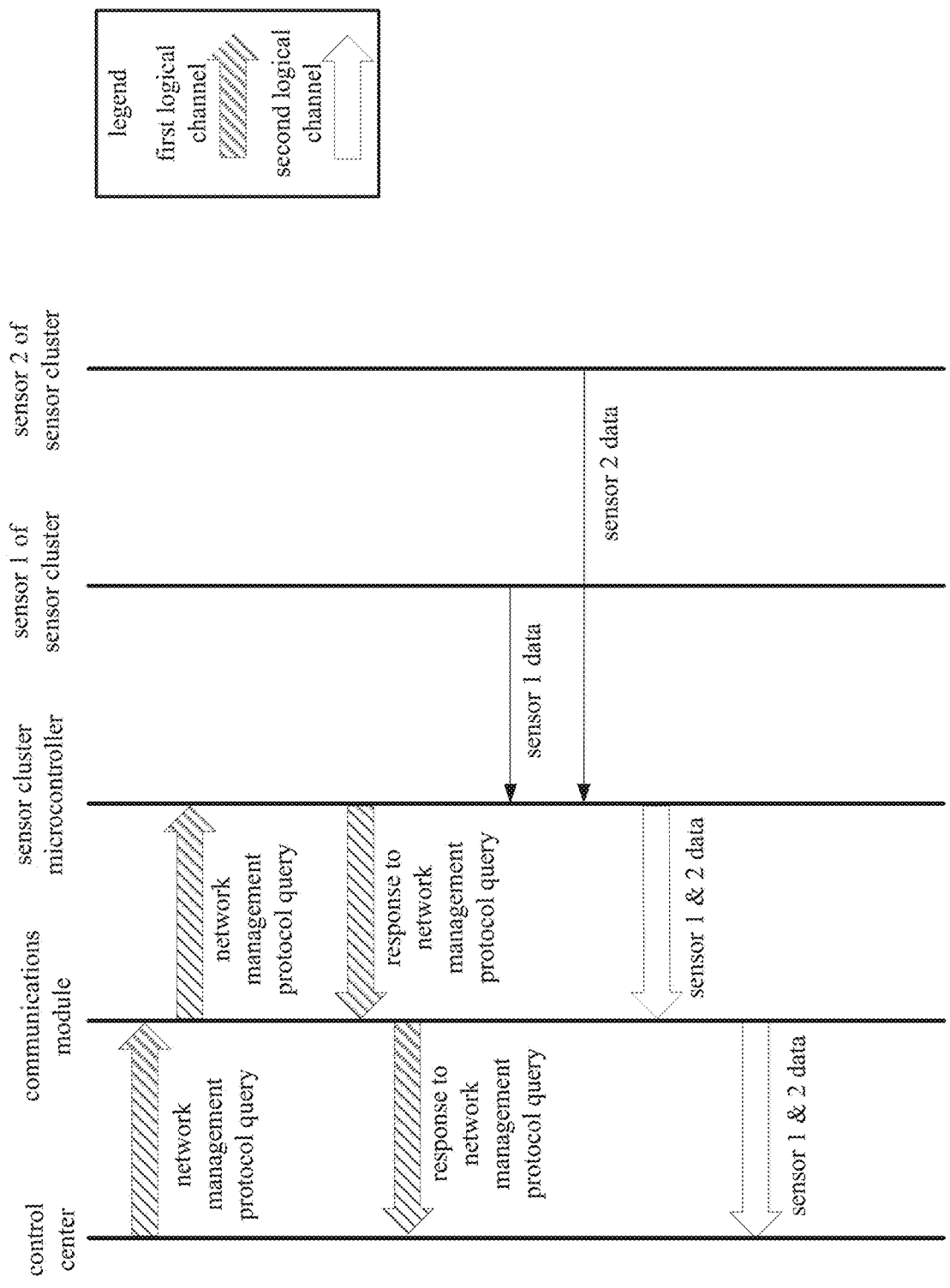
FIG. 6 illustrates example interactions between a multi-sensor agent device and a control center.

FIG. 6 is an interaction diagram 600 illustrating example interactions between a multi-sensor agent device and a control center, such as those described above with respect to FIG. 5. FIG. 6 is shown with reference to a specific example in which the agent device includes a single sensor cluster having first and second sensors, for the sake of simplicity. A similar set of interactions can be applied to other scenarios, such as scenarios in which the agent device has a larger number of sensors and/or multiple sensor clusters. Further, multiple sets of interactions similar to those shown in FIG. 6 can occur simultaneously for multiple sensor clusters of an agent device, and/or between multiple agent devices and the control center. Still further, in some examples, agent devices can interact with multiple different control centers (e.g., control centers associated with different entities; control centers associated with different types of sensors).

In accordance with method 500 and diagram 600, a method for controlling deployed multi-sensor agent devices can include establishing communication with one or more deployed multi-sensor agent devices, with each of the respective agent devices including a power supply, a communications module, and one or more sensor clusters. Each of the respective sensor clusters can include a microcontroller and one or more sensors communicatively coupled with the microcontroller. The method can further include sending signals (via a first set of logical channels) to the deployed agent devices, with the signals identifying at least one sensor type of interest and causing activation of one or more sensors associated with the at least one sensor type of interest. Data collected by the activated sensors can subsequently be received (via a second set of logical channels).

In the depicted example of FIG. 6, the control center sends one or more network management protocol queries via a first logical channel between the control center and a sensor cluster microcontroller of the agent device. At the agent device, the communications module conveys the one or more network management protocol queries to the sensor cluster microcontroller, which receives the one or more network management protocol queries. In the depicted example, the sensor cluster microcontroller is individually-IP-addressable, having a unique IP address assigned to it, or having a range of IP addresses assigned to it with at least one IP address in the range being used by the microcontroller and one or more other IP addresses in the range being used by individual sensors of the sensor cluster. In this way, the sensor cluster microcontroller can be specifically addressed using a unique IP address. The sensor cluster microcontroller sends one or more responses to the network management protocol queries via the first logical channel (or, alternatively, another logical channel) to the control center via the communications module.

The sensor cluster microcontroller also receives data from the sensors of the sensor cluster (i.e., sensor 1 data from sensor 1, and sensor 2 data from sensor 2). The sensor cluster microcontroller sends the sensor data to the control center, through the communications module. The sensor data is conveyed over a second logical channel, which is different than the first logical channel.

FIGS. 5 and 6 show communication of sensor data from agent devices commencing after communication of control data such as network management protocol queries and responses. In practice, sensor data and control data can be transmitted concurrently. For example, control data can be communicated according to a first periodic interval, and sensor data can be communicated according to a second, different periodic interval. Or, as another example, control data (for a pinging service) can be communicated according to a periodic interval, and sensor data can be communicated in response to the control data (for the pinging service).

VI. Example Control of Agent Devices as a Botnet

Figure 7:
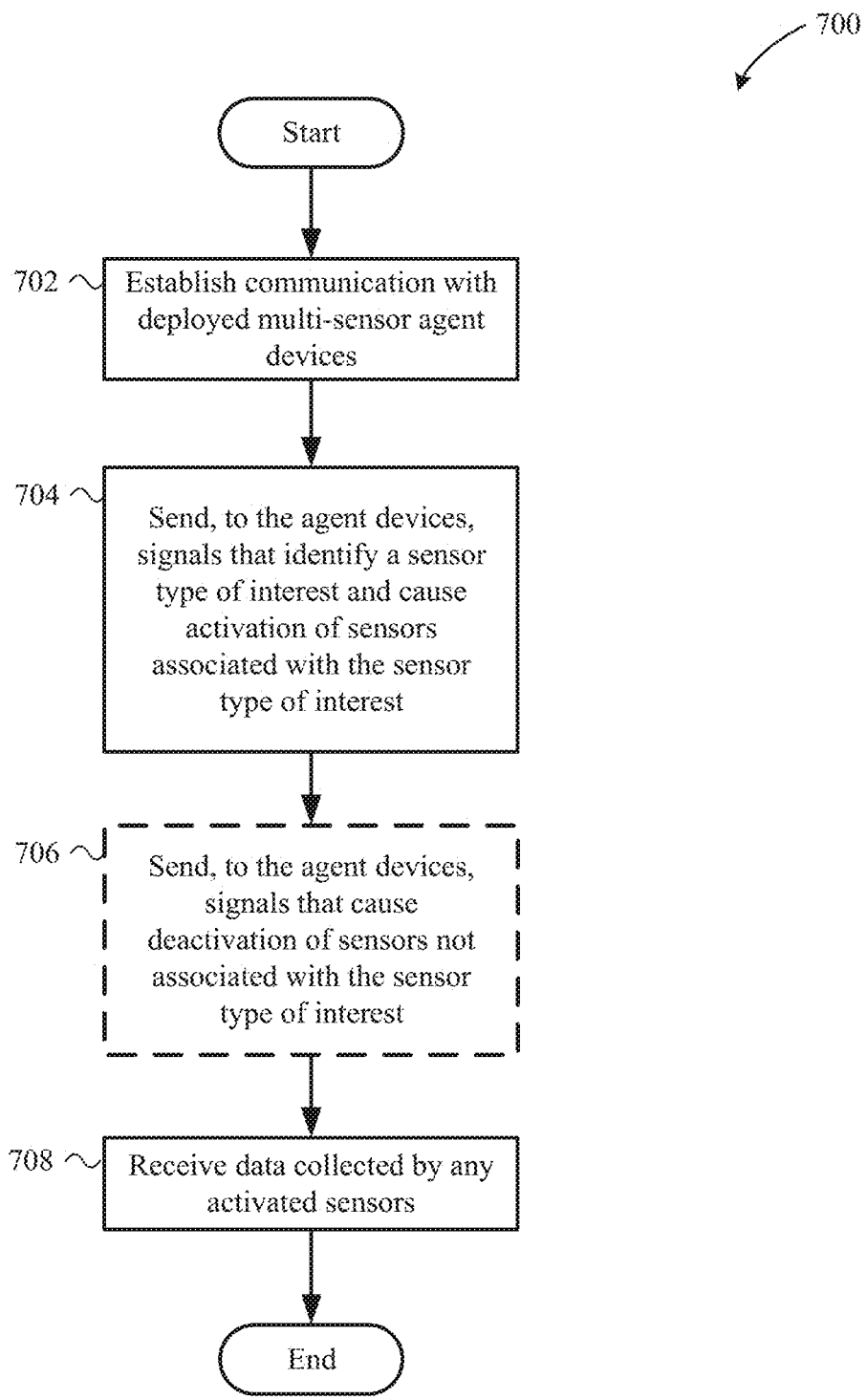
FIG. 7 is a diagram illustrating an example method of controlling multiple deployed multi-sensor agent devices as a botnet.

FIG. 7 illustrates a method 700 of controlling multiple deployed multi-sensor agent devices as a botnet. In process block 702, communication is established with deployed multi-sensor agent devices. For example, the communications modules and network switches of the agent devices can be used establish communication between a control center and sensor cluster microcontrollers of the respective agent devices using first logical channels over a wireless connection. The actions set forth in method 700 can be performed by a control center of a utility, such as control center 110 of FIG. 1.

In process block 704, signals that identify a sensor type of interest and cause activation of sensors associated with the sensor type of interest are sent to the agent devices (e.g., via first logical channels). As one non-limiting example, in a scenario where an entity controlling multiple agent devices is notified of a potential environmental hazard associated with a particular chemical, the signals transmitted to the agent devices in process block 704 can include signals that identify sensors for the particular chemical as the sensor type of interest and cause activation of any sensors in the agent devices that can sense the particular chemical.

In optional process block 706, signals that cause deactivation of sensors not associated with the sensor type of interest are sent to the agent devices (e.g., via first logical channels). For example, in the context of the scenario discussed above in which a potential environmental hazard is associated with a particular chemical, the entity controlling the agent devices can send signals that cause deactivation of sensors in the agent devices that do not sense the particular chemical. Doing so can allow the agent devices to focus on sensing the particular chemical, which in turn can reduce power consumption by sensors and microcontrollers of the respective agent devices and also facilitate rapid transfer of information from the agent devices to the control center by reducing network traffic. In process block 708, data collected by any activated sensors is received (e.g., via second logical channels).

Figure 8:
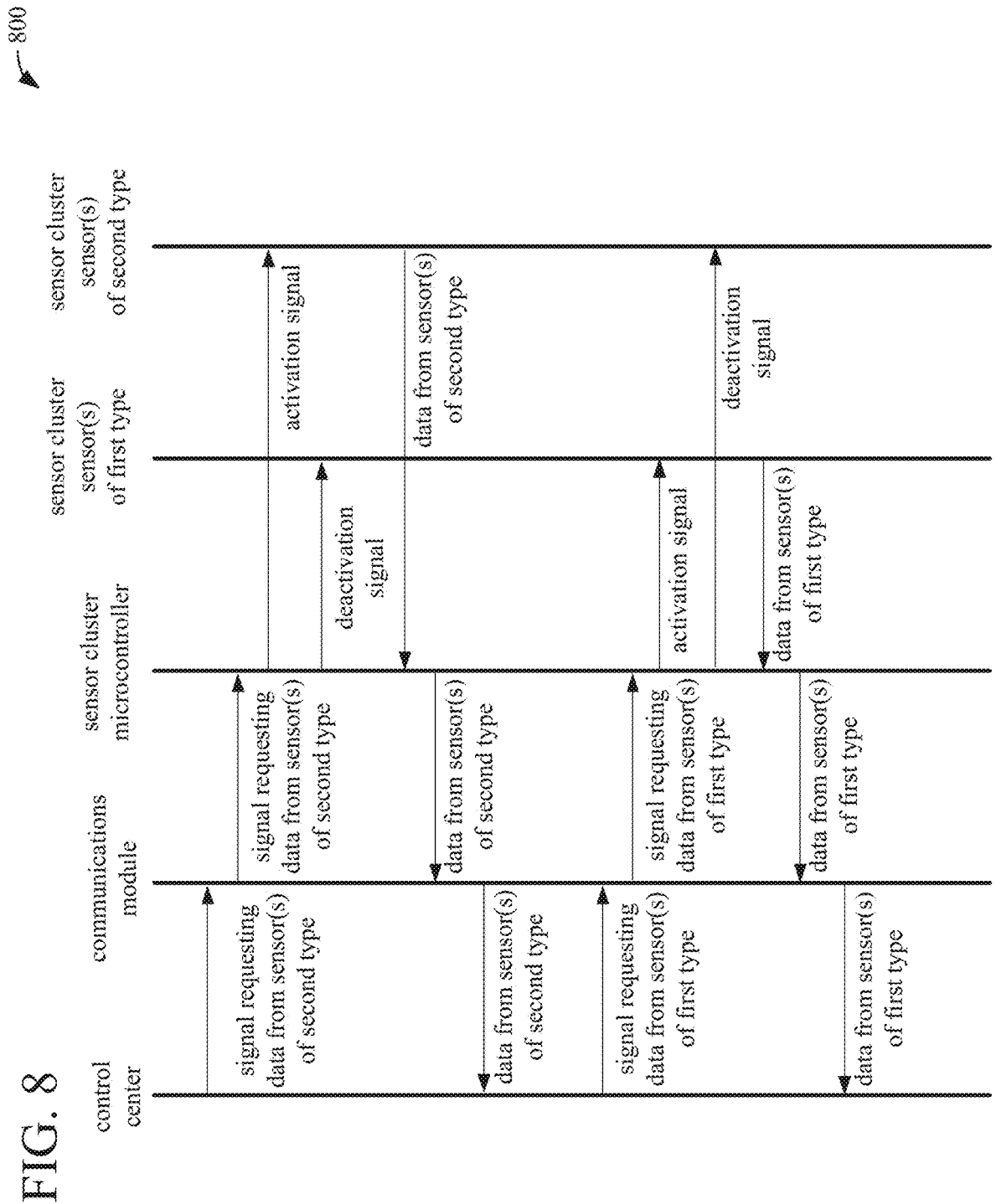
FIG. 8 illustrates example interactions between multiple deployed multi-sensor agent devices and a control center.

FIG. 8 is an interaction diagram 800 illustrating a process such as that described with respect to FIG. 7. FIG. 8 is shown with reference to a specific example involving a single sensor cluster microcontroller having one or more sensors of a first type and one or more sensors of a second type. However, a similar set of interactions can be applied to other scenarios, such as scenarios in which the agent device has a larger number of sensors. Further, multiple sets of interactions similar to those shown in FIG. 8 can occur simultaneously for multiple sensor clusters of an agent device, and/or between multiple agent devices and the control center. Still further, in some examples, agent devices can interact with multiple different control centers (e.g., control centers associated with different entities; control centers associated with different types of sensors).

In accordance with method 700 and diagram 800, a method for controlling deployed multi-sensor agent devices can include establishing communication with one or more deployed multi-sensor agent devices, each which can include a power supply, a communications module, and one or more sensor clusters. Each of the respective sensor clusters can include a microcontroller and one or more sensors communicatively coupled therewith. The method can further include sending signals to the deployed agent devices which identify at least one sensor type of interest and cause activation of one or more sensors associated with the at least one sensor type of interest, and then receiving data collected by the activated sensors. In some examples, the respective agent devices can have different combinations of sensors. For example, the one or more deployed agent devices comprise at least a first deployed agent device and a second deployed agent device, where the first deployed agent device comprises at least one sensor associated with a first sensor type, the second deployed agent device comprises at least one sensor associated with a second sensor type, the first sensor type is different than the second sensor type, and the first deployed agent device does not comprise any sensors associated with the second sensor type.

In the depicted example of FIG. 8, a given agent device includes a sensor cluster with one or more sensors of a first type and one or more sensors of a second type. A control center sends (e.g., via a first logical channel) a signal requesting data from only sensors of the second type. At the agent device, a communications module conveys the signal to the microcontroller of the sensor cluster, which receives the signal. The sensor cluster microcontroller activates the sensor(s) of the second type (using an activation signal) and deactivates the sensor(s) of the first type (using a deactivation signal). The sensor(s) of the second type provide sensor data to the sensor cluster microcontroller, which sends (via a second logical channel) the sensor data to the control center, through the communications module.

Subsequently, the agent device is reconfigured. The control center sends (e.g., via the first logical channel) a signal requesting data from only sensors of the first type. At the agent device, a communications module conveys the signal to the microcontroller of the sensor cluster, which receives the signal. The sensor cluster microcontroller activates the sensor(s) of the first type (using an activation signal) and deactivates the sensor(s) of the second type (using a deactivation signal). The sensor(s) of the first type provide sensor data to the sensor cluster microcontroller, which sends (via a second logical channel) the sensor data to the control center, through the communications module.

FIG. 8 shows a single example of reconfiguration of an agent device. More generally, a botnet of agent devices can be dynamically re-purposed to collect and provide sensor data of different types.

VII. Example Control of Agent Device

Figure 9:
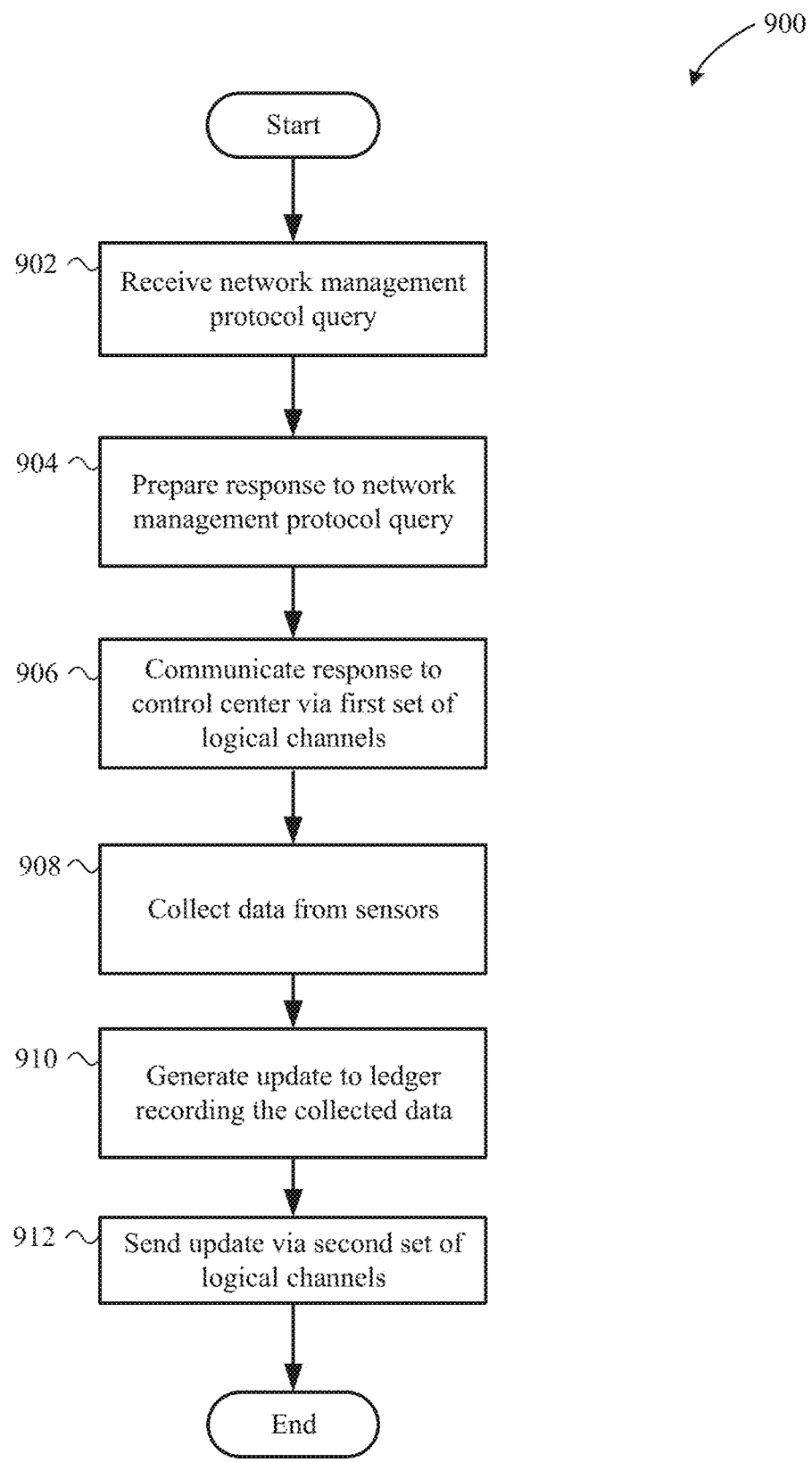
FIG. 9 is a diagram illustrating an example method of controlling an agent device.

FIG. 9 illustrates a method 900 of controlling an agent device. Method 900 can be performed by an agent device; for example, certain processes of method 900 can be performed by one or more sensor cluster microcontrollers of an agent device, whereas other processes of method 900 can be performed by a communications module of the agent device.

In process block 902, a network management protocol query is received (e.g., via a first logical channel). In process block 904, a response to network management protocol query is prepared. In process block 906, the response is communicated to the control center via a first logical channel. In process block 908, data is collected from the sensors. In process block 910, an update to a ledger recording the collected data is generated. For example, a blockchain ledger update comprising the collected data can be generated in the manner described below with respect to FIG. 10. Alternatively, the ledger can be a non-blockchain ledger, such as a data structure stored in memory of the agent device, or a data structure stored in memory of the computer system of the control center. In process block 912, the ledger update is sent via a second logical channel (e.g., a second logical channel for the sensor cluster microcontroller). Alternatively, collected data can be aggregated into different ledger updates for different sensor clusters or different ledger updates for different sensors, and sent to the control center via a second set of logical channels.

In accordance with method 900, a system can include a plurality of deployed multi-sensor agent devices, with each of the respective agent devices comprising a power supply, a communications module, and one or more sensor clusters. Each of the respective sensor clusters can include a microcontroller and one or more sensors communicatively coupled with the microcontroller. Each of the respective agent devices can be configured to perform operations included preparing responses to network management protocol queries from the control center, the responses being communicated by the communications module via a first set of logical channels, collecting data from at least one of the sensors of the agent device, generating an update (per sensor or per sensor cluster) to a ledger that records the collected data, and sending the update through the communications module via a second set of logical channels different from the first set of logical channels.

FIG. 9 shows communication of sensor data from an agent device commencing after communication of control data such as network management protocol queries and responses. In practice, sensor data and control data can be transmitted concurrently. For example, control data (for a pinging service) can be communicated according to a periodic interval, and sensor data can be communicated in response to the control data (for the pinging service).

VIII. Example Method of Updating a Blockchain Ledger

Figure 10:
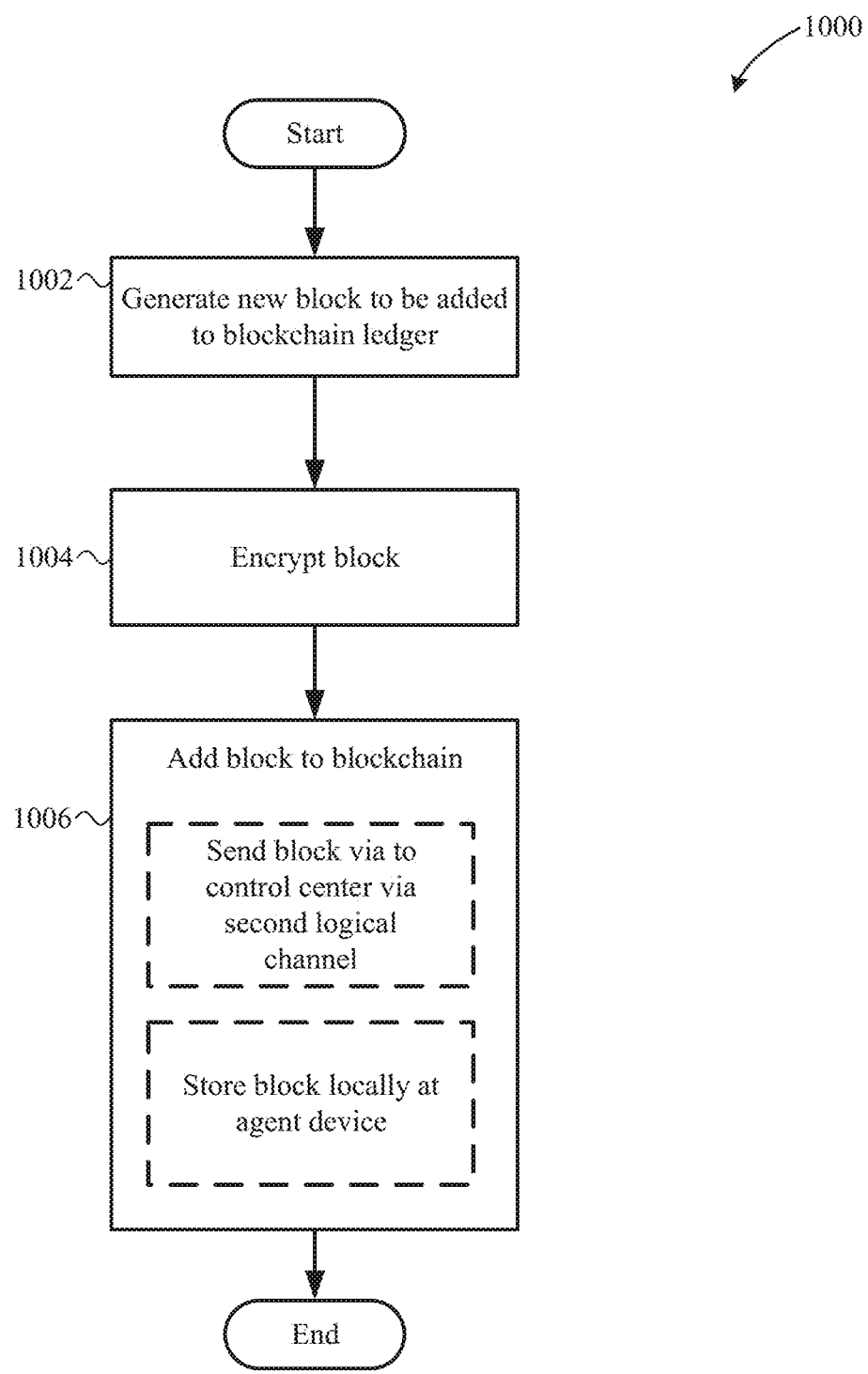
FIG. 10 is a diagram illustrating an example method of updating a blockchain ledger.

FIG. 10 illustrates a method 1000 of updating a blockchain ledger. As discussed above with respect to FIG. 4, the blockchain ledger can be stored at a control center. Or, the blockchain ledger can be a distributed blockchain ledger, with portions of the blockchain being stored at different devices. Sensor data can be stored locally on agent devices, then submitted upstream for validation on a parent distributed ledger, or for even more granularity, individual sensors can hold their own blockchain. The blockchain ledger can store readings taken by sensors of the agent devices, and the sensor data can be digitally signed, allowing the sensor data to be used for validation of agent device authenticity. The sensor data can be recorded as a time series, including timestamped measurements. Location data (indicating the geographical location at which measurements were made) can be recorded along with the timestamped measurements.

In some example configurations, sensor data from all agent devices is stored in the same blockchain. In this case, a block of the blockchain can include an identifier for the agent device that provided the sensor data, an identifier of each sensor cluster that provided the sensor data in the block, and a time series of sensor data for each of the sensors of the respective sensor clusters that provided the sensor data in the block.

Alternatively, sensor data from different agent devices can be stored in different blockchains, one blockchain per agent device. In this case, a block of the blockchain can include an identifier of each sensor cluster that provided the sensor data as well as a time series of sensor data for each of the sensors of the respective sensor clusters that provided the sensor data in the block. An identifier for the agent device whose sensor data is recorded in the blockchain can be included in each block or otherwise associated with the blockchain.

Alternatively, sensor data from different sensor clusters of a given agent device, or group of agent devices, can be stored in different blockchains, one blockchain per sensor cluster or type of sensor cluster. In this case, sensor data from multiple types of sensors of a given sensor cluster is stored in the same blockchain. A block of the blockchain can include an identifier for the sensor cluster that provided the sensor data, an identifier for the agent device that includes the sensor cluster, and a time series of sensor data for each of the sensors of the sensor cluster.

Alternatively, sensor data from different sensors of a given agent device, or group of agent devices, can be stored in different blockchains, one blockchain per sensor or type of sensor. A block of the blockchain can include an identifier for the sensor cluster that provided the sensor data, an identifier for the agent device that includes the sensor cluster, and a time series of sensor data for the sensor.

Thus, sensor data from different sensor clusters of a given agent device can be stored in the same blockchain or different blockchains (e.g., associated with the respective sensor clusters of the agent device). Sensor data from different agent devices can be stored in the same blockchain or different blockchains (e.g., associated with the respective agent devices, or with respective types of sensor clusters, or with respective types of sensors).

With reference to FIG. 10, in process block 1002, a new block to be added to a blockchain ledger is generated. For example, a sensor cluster microcontroller of an agent device can generate a ledger update comprising readings from one or more sensors of the sensor cluster. The ledger updates provide an audit trail for sensor data. Ledger updates can be signed by sensor cluster microcontrollers according to a digital signature process. Subsequently, the ledger updates can be used by an entity such as a control center of a utility to validate the operational status or authenticity of the agent device.

In process block 1004, the block generated in process block 1002 is encrypted. For example, the encryption of the process block can be performed using an encryption key provided by an encryption service such as encryption service 126 of FIG. 1. The encryption service can create and manage encryption keys. In such an example, software implementing aspects of the distributed blockchain ledger can make a call to the encryption service to receive the encryption key used to encrypt the block. The service can create the keys, retain a private key, and provide a public key to the software that made the call to the service. The encryption service can be a web service. In some examples, a single encryption key can be used and can be stored (after secure communication from the encryption service) as, for example, an environmental variable on a computer storage device associated with the blockchain ledger.

In process block 1006, the block is added to a blockchain, such as a blockchain distributed ledger. Adding the block to the blockchain can optionally include sending the new block to the control center via a second logical channel, such as the second logical channel discussed above. Further, adding the block to the blockchain can optionally include storing the block locally at the agent device. For example, one or more blocks of the blockchain ledger (including the new block) can be stored in memory onboard the agent device, such as in on-chip memory of a sensor cluster microcontroller or in local measurement storage. A given block can be stored locally at the agent device for a predetermined period of time, such as two weeks, and then can be erased to free up space for storage of newer blocks.

IX. Example Environment for Agent Device Botnet

Figure 11:
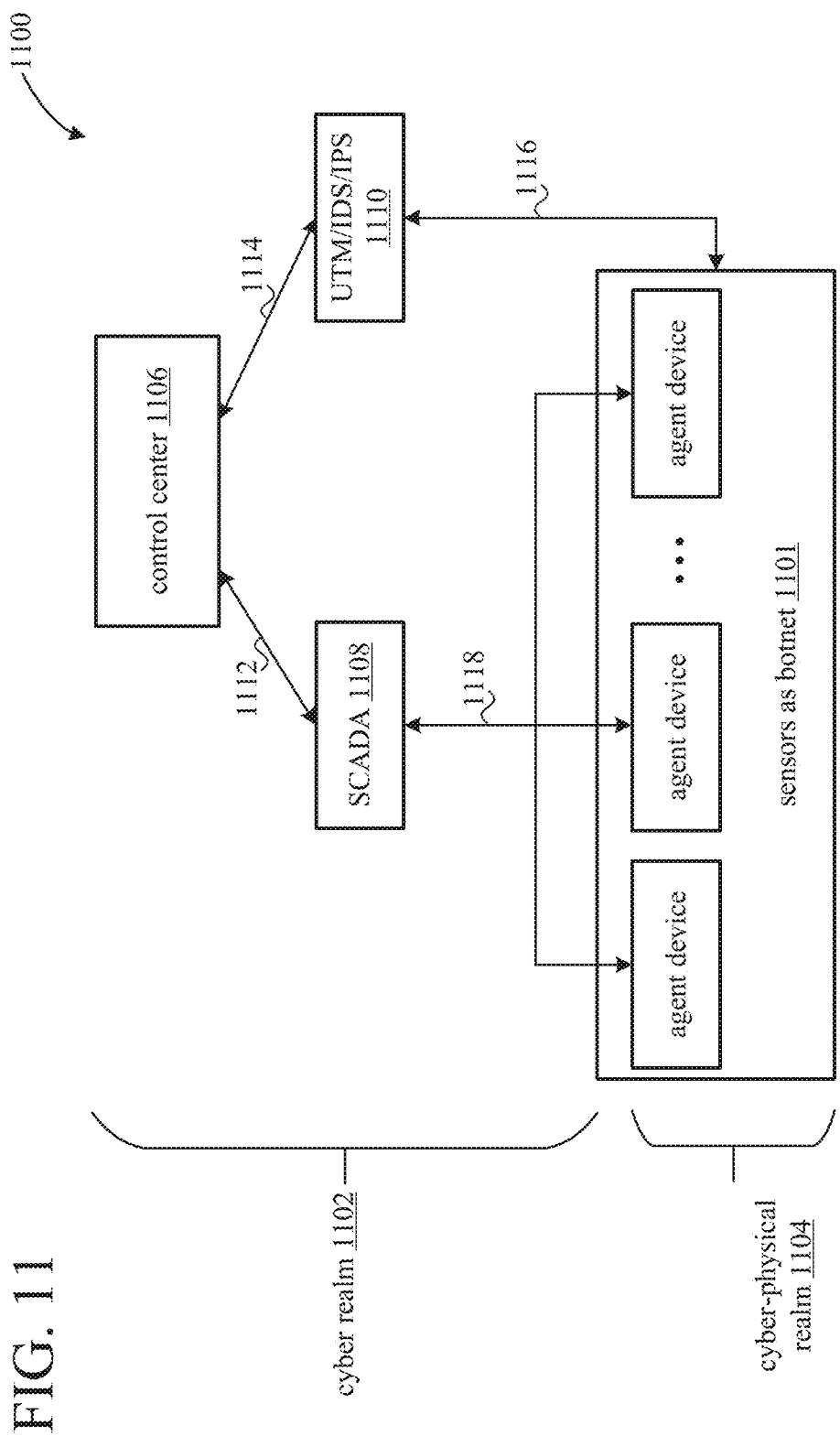
FIG. 11 is a block diagram of an example environment in which sensors of agent devices are controllable as a botnet.

FIG. 11 illustrates an example environment 1100 in which multiple agent devices can be implemented a botnet 1101. Environment 1100 includes a cyber realm 1102 and a cyber-physical realm 1104.

Cyber realm 1102 includes a control center 1106, which includes a SCADA system 1108 and a UTM/IDS/IPS 1110. Communication between control center 1106 and SCADA system 1108 occurs via a logical channel 1112, and communication between control center 1106 and UTM/IDS/IPS 1110 occurs via a logical channel 1114.

Cyber-physical realm 1104 includes multiple agent devices collectively forming a botnet 1101. While a first agent device 102, a second agent device 104, and an $n^{th}$ agent device 106 are depicted; the ellipsis mark indicates that some number of additional agent devices, which are not shown, can also be included in botnet 1101. The agent devices forming the botnet can be referred to as cyber-physical devices, in that they are configured to perceive and reacts to their environment.

As shown, the agent devices of botnet 1101 communicate with UTM/IDS/IPS 1110 via a logical channel 1116, and with SCADA system 1108 via a logical channel 1118. In particular, network management protocol queries and responses can be exchanged via UTM/IDS/IPS 1110 and botnet 1101 via logical channel 1116, whereas sensor data, including blockchain ledger updates with sensor data, can be exchanged via SCADA system 1108 and botnet 1101 via logical channel 1118. Although the logical channel 1116 is shown as a single logical channel, in practice a set of multiple logical channels can be used (e.g., one logical channel per agent device, or one logical channel per sensor cluster microcontroller). Similarly, although the logical channel 1118 is shown as a single logical channel, in practice a set of multiple logical channels can be used (e.g., one logical channel per agent device, or one logical channel per sensor cluster microcontroller, or one logical channel per sensor).

X. Electric Power Utility Use Case

Electric power utilities can utilize the agent devices described herein to increase the visibility of assets distributed on the electrical power grid and augment the information of the existing sensors that report to distributed control systems (DCSs) and SCADA systems, thereby providing cyber-physical electrical grid security and restoration. In such applications, the agent devices can alternatively be referred to as "grid agents." For example, the agent devices can be deployed around numerous grid assets, such as electrical substations, in stationary or mobile platforms.

The deployed agent devices can integrate multiple parameters related to the electrical power grid and incorporate multiple sensors to provide physical, electrical, and ambient information for remote assets, which can become more isolated in the event of a disaster. Towards this end, the agent devices can be equipped with components configured to measure electrical parameters such as current, voltage, frequency, and phase angle as well as other specific parameters associated with electrical power grid elements, devices, and systems. By monitoring physical parameters related to the extended grid state, the agent devices can provide continuous information on the health of the electrical grid. The physical sensors can provide dual functionality in that they monitor a specific suite of physical parameters while providing network communication information to a security system of the utility. Information from such dual-use sensors can enable the correlation of cyber status with grid operations to identify the location of an anomaly and then isolate and mitigate it immediately.

The data collected from the agent devices can be sent to the utility control center, via a combination of wireless, wired, and fiber optic communications, to provide information related to the current status of the electrical grid. For example, the sensor data collected by the agent devices can be transmitted to a SCADA system of the electric power utility. Further, the agent devices can include built-in cyber-aware features (e.g., digital signature processes implemented by sensor cluster microcontrollers) for authenticating sensor communication.

In the event of a disaster, the agent devices can track and monitor the system state of the electrical grid and send critical data to the control center. The utility can analyze the real-time measurements to understand grid failures. Accordingly, the agent devices can provide information on the state of the grid, failures, and resources available to create an effective restoration pathway. During a power outage, the agent devices can continue to collect and store data until their batteries are depleted. By aggregating data continuously, the agent devices can provide a record of conditions before, during, and after extreme events. In some examples, the agent devices are equipped with a rugged and weatherized housing to protect components such as sensors and imagers from inclement weather conditions. This can allow the agent devices to continue surveillance and streaming of data to the control center under extreme weather conditions.

The agent devices can be configured as either stationary or mobile modules. The stationary agent devices can be designed for installation outside a substation, for example. The stationary sensor platform can be strategically located to perform real-time monitoring of critical assets such as transformers. The aggregated data can allow for rapid assessment of available grid assets, so that an effective restoration plan can be made under conditions in which human resources might be limited. As discussed further below, mobile agent devices can be miniaturized versions of the stationary agent devices. A mobile agent device can be mounted on a drone to surveille pole-mounted transformers, overhead conductors, and pole-mounted power/current transformers. The mobile agent devices can also have the capability to communicate wirelessly with the stationary units, making it possible for a utility crew to use a mobile agent device to collect and store data from its stationary counterparts. In this way, the agent devices can provide the utility with information on an asset, its electrical parameters, and its surroundings, thereby providing a time-stamped record of faults in the system. The agent devices can thus provide a utility or other entity with a three-dimensional mobile web of situational awareness.

Figure 12A:
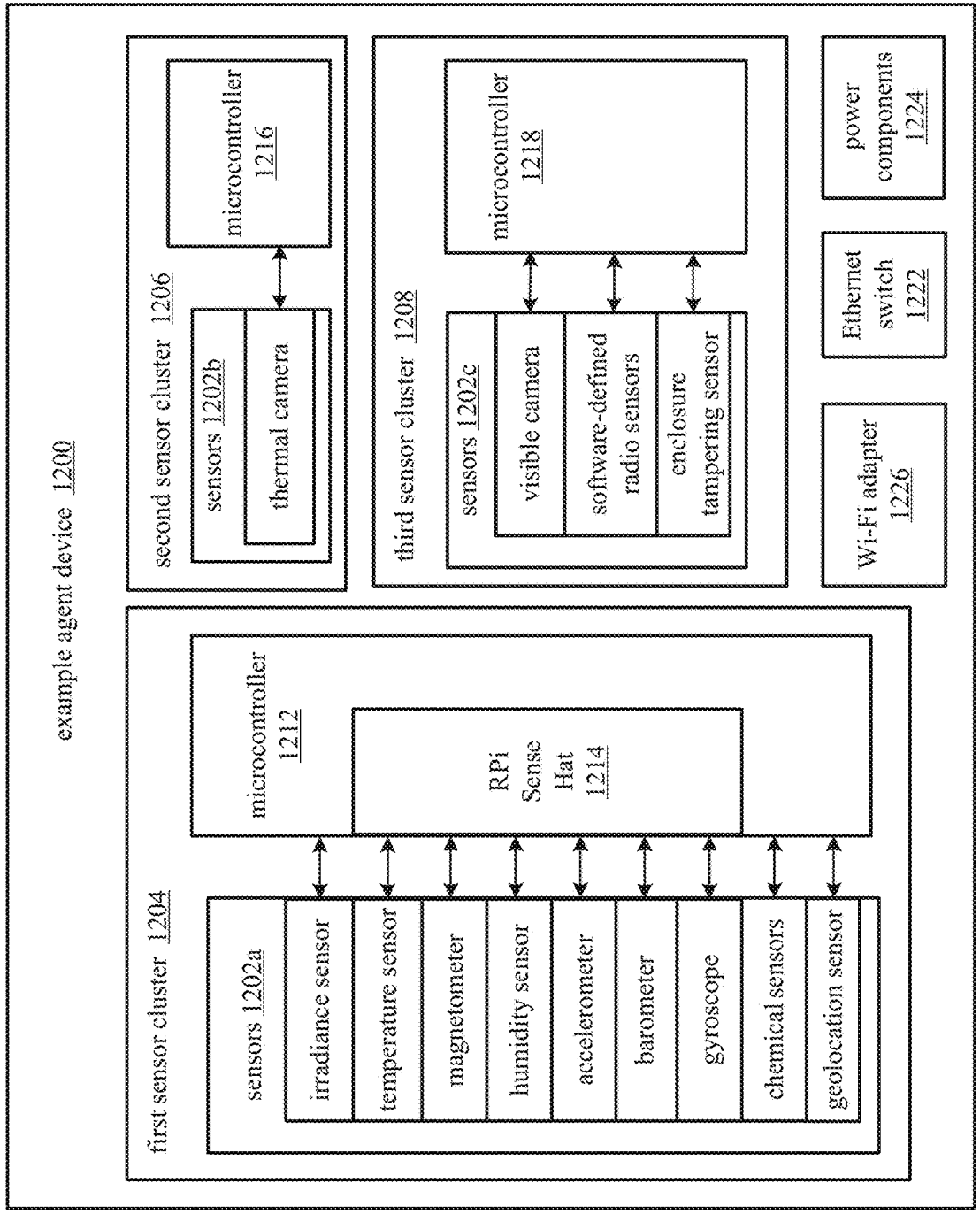
FIGS. 12A-D illustrate a specific implementation of a multi-sensor agent device.
Figure 12B:
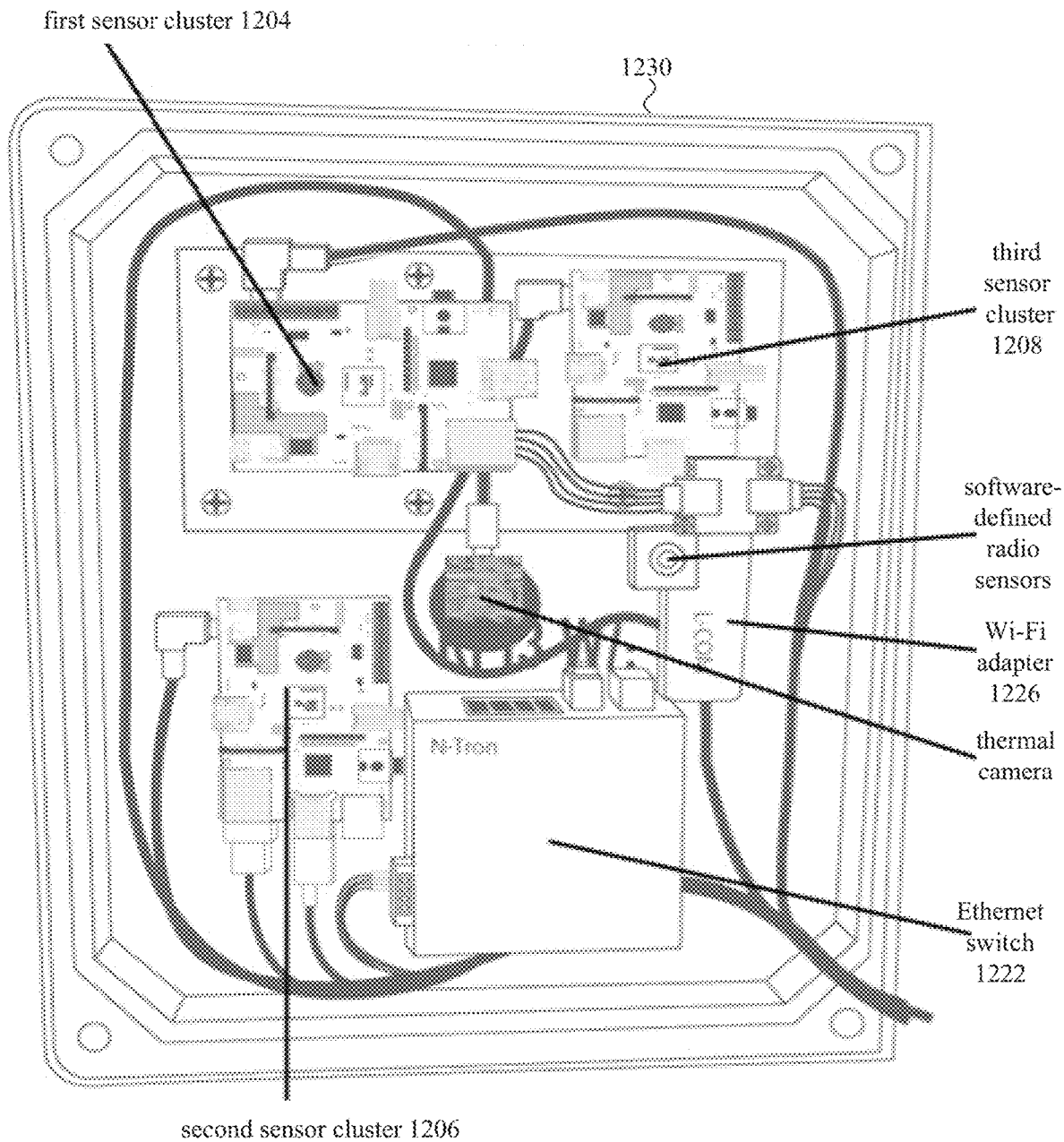
Figure 12C:
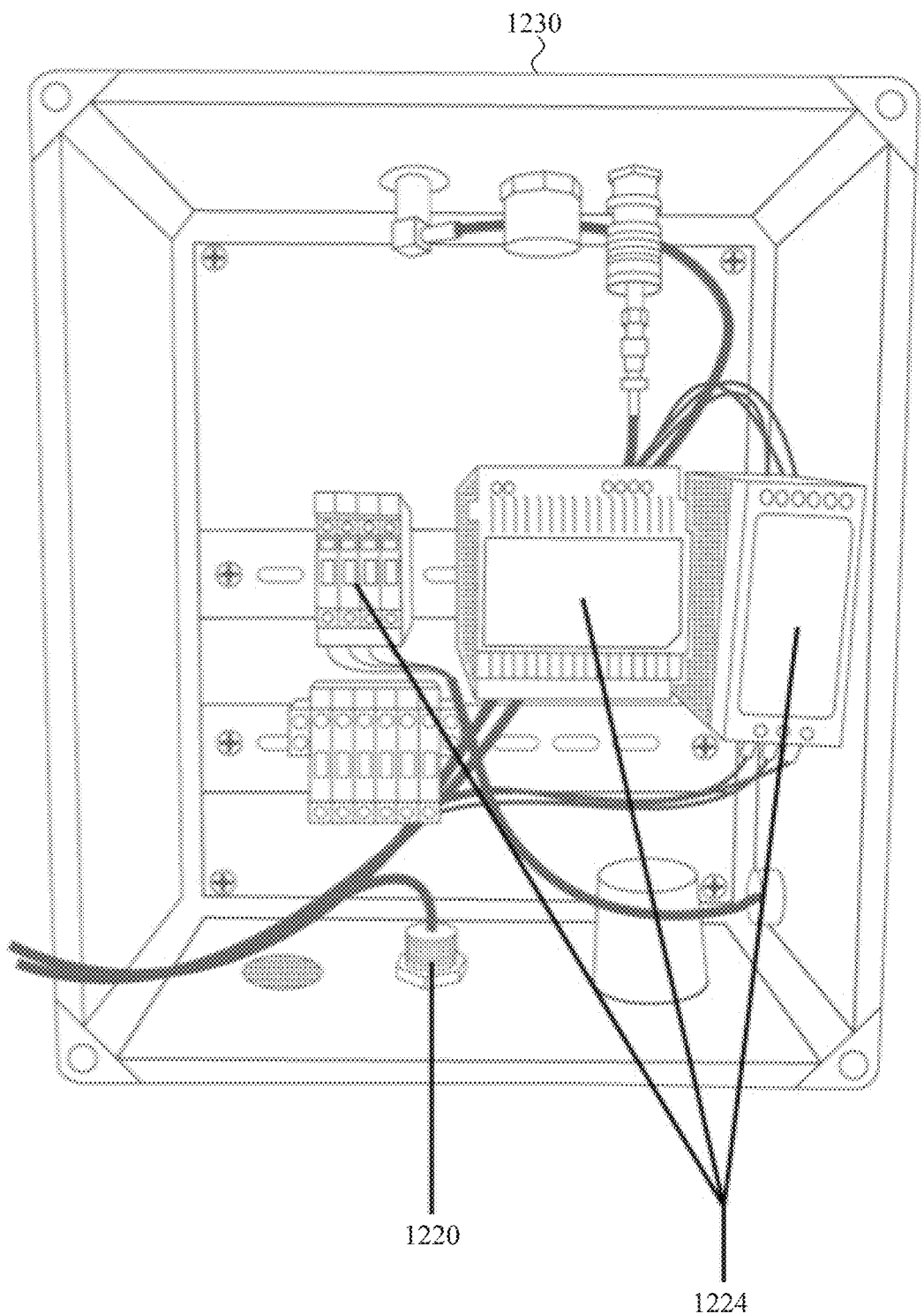
Figure 12D:
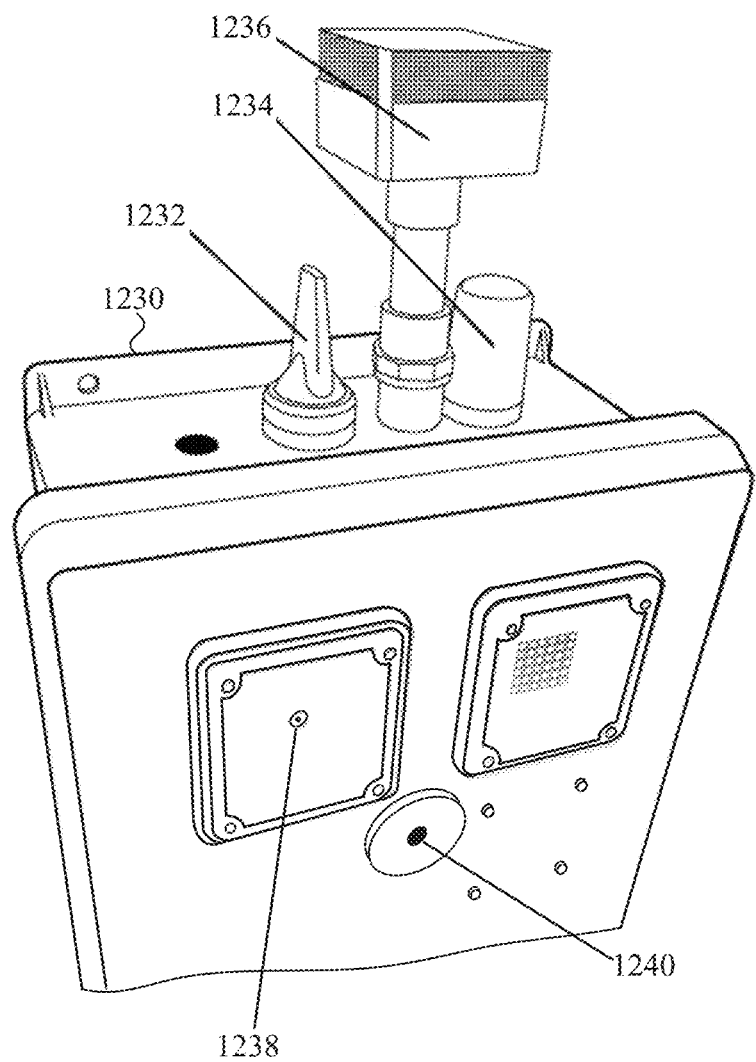

FIGS. 12A-D illustrate an example implementation for an agent device 1200, which can be used in the context of an electric power utility use case. Agent device 1200 is a non-limiting specific example of agent device 200 described above with respect to FIG. 2. FIG. 12A illustrates a block diagram of agent device 1200; FIG. 12B is a view of the inside of the door of an example enclosure housing device 1200; FIG. 12C is a view of the inside of the example enclosure of FIG. 12B; and FIG. 12D is a perspective view of the outside of the top portion of the example enclosure of FIGS. 12B-C.

Agent device 1200 includes multiple sensors 1202. The particular sensors 1202 included in example agent device 1200 are listed in Table 1 below.

TABLE 1

| Sensor | Measurement Units | Sensitivity | Communication |
|---|---|---|---|
| Chemical MQ series: $CH_4$ $H_2$ | ppm | ≤1000 | DNP3, HTTP (dashboard) |
| Irradiance | lux | 3 to 220k, 2 mm × 2 mm chip | DNP3, HTTP (dashboard) |
| RPi Sense Hat: | | | DNP3, HTTP (dashboard) |
| Gyroscope | dps | ±245/500/2000 dps | |
| Accelerometer | g | ±2/4/8/16 g | |
| Magnetometer | gauss | ±4/8/12/16 gauss | |
| Barometer | hPa | 260-1,260 hPa absolute range | |
| Temperature | ° C. | ±2° C. in the 0-65° C. range | |
| Relative humidity | % rH | Accuracy to ±4.5% for 20%-80% rH Accuracy to ±0.5° C. in 15° C.-40° C. | |
| Software-defined radio sensors: corona discharge sensor cellphone signal sensor drone detector | MHz | 64-2,500 MHz range, −97.5 dBm | DNP3, HTTP (dashboard) |
| Thermal Imager | — | 80 × 60 pitch | MJPEG |
| Visible Imager | — | 3280 × 2464 pixel | MJPEG, RTSP |
| Enclosure tampering sensor (magnet) | — | RF range up to 150 feet in open air | DNP3 |
| Geolocation | GPS (civilian) | 3 meter resolution | DNP3 |

At least some of the sensors 1202 can be included in sensor clusters. In the depicted example, a subset of sensors 1202a are included in a first sensor cluster 1204, another subset of sensors 1202b are included in a second sensor cluster 1206, and another subset of sensors 1202c are included in a third sensor cluster 1208. The sensors of first sensor cluster 1204 are in communication with a microcontroller 1212, the sensors of second sensor cluster 1206 are in communication with a microcontroller 1216, and the sensors of third sensor cluster 1208 are in communication with a microcontroller 1218. Microcontrollers 1212, 1216, and 1218 can each include features similar to those discussed above with respect to microcontroller 300 of FIG. 3.

Sensors 1202a of first sensor cluster 1204 include a solar irradiance sensor, which can alternatively be referred to as an ambient light sensor. In conjunction with other ambient parameter sensors, the irradiance sensor can allow the utility to collect local weather information. Towards this end, the specific location at which the agent device is deployed at or inside of a grid asset (e.g., substation) can be chosen such that the agent device (or at least the irradiance sensor of the agent device) can receive direct sunlight. In some examples, placing the irradiance sensor at the top of the enclosure of the agent device can maximize sunlight exposure. As an alternative, the agent device can optionally include a solar collector for the irradiance sensor; a customized PVC pipe can be used to hold the solar collector, as well as to serve as a watertight conduit for interface wires to the microcontroller. An optical fiber can guide the light collected by the solar collector to the irradiance sensor inside the enclosure. Information on solar lux is collected, which is a measure of illumination of a surface with units of 1×. Illuminance is related to luminance by the equation:

$$E_v = \frac{A}{\Phi_v}$$

The above equation assumes a perfect diffuse reflecting surface where A is the illuminated area and $\Phi_v$ is the luminance. The irradiance measurements taken by the irradiance sensor can be acquired by the associated microcontroller, time-stamped, and transmitted along with location information. The sensor data (timestamped measurements, location information, etc.) can be transmitted in a protocol data format that the SCADA system of the utility can understand, such as DNP3. Communication of the measurements can utilize the same wireless-fiber optic network described above. The solar irradiance information can be used by the utility for purposes such as a solar microgrids generation forecast. One example of an irradiance sensor that can be included in agent device 1200 is the TSL45315 device manufactured by National Control Devices.

Sensors 1202a of the first sensor cluster further include sensors measuring chemical and ambient parameters, which can be important measurements for monitoring asset health and surrounding conditions. For example, the chemical parameters can be used to analyze failures on a transformer via dissolved gas analysis. Similarly, ambient measurements can be used to predict systems failures and forecast electricity load, for example. The chemical sensors of first sensor cluster 1204 can include MQ series semiconductor sensors performing chemical measurements for $CH_4$ and $H_2$. In other examples, additional MQ series semiconductor sensors can be included, such as sensors that allow for the detection of $N_2O$, CO, and VOCs. The sensitivity of these sensors can be in the thousands of parts per million.

The sensors measuring the ambient parameters can be integrated circuit-based sensors. In the depicted example, first sensor cluster 1204 includes an RPi Sense Hat 1214 to monitor different ambient parameters. RPi Sense Hat 1214 is a specific type of interface module which includes integrated circuit-based sensors including a gyroscope, an accelerometer, a magnetometer, a barometer, a temperature sensor, and a relative humidity sensor, all of which can produce sensor data formatted within the DNP3 protocol specifications and transmitted to a utility control center (e.g., to a SCADA system). These parameters can be used to determine the internal (to the agent device) status as well as the ambient conditions outside of the agent device. In some examples, the gyroscope, accelerometer, and magnetometer are implemented by a single sensor called an Inertial Measurement Unit (IMU).

In addition, sensors 1202a of the first sensor cluster include a geolocation sensor, which can an integrated GPS receiver. For fixed deployments of agent devices, the geolocation sensor can be omitted, and coordinates that have been entered into a database such as a SCADA database can instead be used by the electrical power entity as location information for sensor data.

Second sensor cluster 1206 includes a thermal camera 1202b in communication with a microcontroller 1216, which can include features similar to those discussed above with respect to microcontroller 300 of FIG. 3. The thermal camera can be an IR thermal camera configured to capture stills or streams of thermal images, such as thermal images of substation transformers. In some examples, the thermal camera can be a Pure Thermal 1 FLIR Lepton Smart I/O module. The thermal camera can provide an operator with real-time thermal images of grid assets such as substations, e.g. in the form of a Motion JPEG (MJPEG) file. For example, an agent device can be mounted to a support bracket located outside within the substation. The agent device can be positioned and aligned such that it allows the thermal camera to capture live thermal video of the transformers. The thermal camera can also be used in a security manner to monitor intrusion into a substation. The thermal camera can also provide temperature information to monitor the health of the assets. The thermal camera can be mounted on the door of an enclosure of the agent device, and can be protected by a germanium optical window (e.g., a germanium optical window manufactured by Nivo Technology). In other examples, second sensor cluster 1206 can include other sensors 1202b in addition to the thermal camera.

Third sensor cluster 1208 includes a plurality of sensors 1202c in communication with a microcontroller 1218, which can include features similar to those discussed above with respect to microcontroller 300 of FIG. 3. The sensors of third sensor cluster 1208 include a visible camera, a plurality of software-defined radio sensors, and an enclosure tampering sensor. The software-defined radio sensors can include a corona discharge sensor, a drone detector, and a cellphone signal sensor. The drone detector and cellphone signal sensor can be characterized as physical intrusion protection sensors.

The visible camera can be configured to generate data including stills or streams of visible images, such as visible images of substation transformers. In some examples, the visible camera can be included in a camera kit for the microcontroller, such as the RPi3 Model B+ Camera Kit. For example, the visible camera can be an RPi Sony IMX219. Similar to the thermal camera discussed above with respect to the second sensor cluster, the visible camera can provide an operator with real-time visible images of grid assets such as substations, and can be used (for security) to monitor intrusion into an asset. The visible images can be transmitted as MJPEG files using the Real Time Streaming Protocol (RTSP), for example.

The corona discharge sensor can be an RF sensor configured to detect electrical arcing and corona discharge conditions, which can occur when there is a problem with grid components such as disconnectors, circuit breakers, insulators, etc.

The drone RF detector can be configured to detect the presence of UASs such as drones within a specified distance from the agent device, by detecting RF signals associated with UASs. Towards this end, the drone RF detector can monitor a specified frequency range (e.g., the 2.4 GHz frequency range) for service set identifier (SSID). The SSID is an identification tag for wireless connectivity of a UAS. In operation, SSIDs detected by the drone RF detector are compared with a library of SSIDs, and if a positive match is detected in a list of problematic SSIDs (or, alternatively, no match is found in a list of accepted SSIDs), an alert is sent to the utility control center. The detection area coverage for the drone RF detector can be approximately 150 meters in diameter, for example.

The cellphone signal sensor can be an RF sensor configured to monitor the signal levels in the control channel frequency of major cellphone networks in the area being monitored. The detection area can be an approximately 75 m radius from an antenna of the agent device, for example. Upon detecting a signal from a cellphone of a potential intruder via the cellphone signal sensor, the agent device can send an alert to the control center of the utility. For example, the cellphone signal sensor can transmit a graph to the control center that indicates the frequency band and the measurement of the relative power over a period of time for a specific cell phone carrier. The cellphone signal sensor can operate similarly to the drone RF detector.

The enclosure tampering sensor can utilize one or more magnets, an electrical circuit, or another mechanism to detect potential tampering with the agent device (e.g., unauthorized attempts at opening the agent device).

The respective sensor clusters (e.g., the microcontrollers of the respective sensor clusters) can each be individually IP-addressable. Alternatively or additionally, one or more individual sensors of the first and second sensor clusters can each be individually IP-addressable (e.g., using an IP address in a range assigned to the microcontroller). For example, the thermal camera of the second sensor cluster and visible camera of the third sensor cluster can each be individually IP-addressable, and thus can each be associated with a unique IP address.

The visible and thermal cameras can provide an operator with real-time images of grid assets such as substations. For example, an agent device can be mounted to a support bracket located outside within the substation. The agent device can be positioned and aligned such that it allows the cameras to capture live video of the transformers. The visible imager (RPi3 Model B+) and thermal imaging (Pure Thermal 1 FLIR Lepton Smart I/O module) can also be used to monitor intrusion into a substation. The thermal imaging also provides temperature information to monitor the health of the assets. Both imagers can be mounted on the door of the enclosure. The thermal imager can be protected by a germanium optical window.

Agent device 1200 further includes an RF transceiver 1221 and an Ethernet switch 1222. RF transceiver 1221, which is a specific example of communications module 214 of FIG. 2, can be configured for communications in an ISM Band (433/900 MHz, 2.4 GHz). Ethernet switch 1222, which is a specific example of network switch 216 of FIG. 2, can be configured to connect the agent device and the components thereof with the control center (and/or other agent devices) using packet switching in accordance with a protocol suite to receive, process, and forward data. Towards this end, as shown in FIG. 12C, the agent device can include an Ethernet port 1220. Further, as shown in FIG. 12B, the agent device can include a Wi-Fi adapter 1226.

Agent device 1200 further includes power components 1224, which can include a power supply configured to supply power to the various components of the agent device. The power supply can provide an appropriate DC voltage, such as 5 V DC, to the respective hardware elements of the agent device. In some examples, power components 1224 include a DIN-rail mounted power module. Similar to power supply 220 of FIG. 2, power components 1224 can include a power supply that receives power from an external power source. In other examples, however, power components 1224 can include an autonomous power supply that generates its own power (e.g., by harnessing solar radiation). Power components 1224 can also include various power distribution components such as a Hubbell power connector. In addition, agent device 1200 can optionally include an energy storage device, such as a battery or a fuel cell configured to supply energy to and absorb energy from a power supply of power components 1224.

The various components of agent device 1200 can be packaged in an enclosure, such as example enclosure 1230 shown in FIGS. 12B-D. Enclosure 1230 can be a NEMA enclosure that includes features tailored to the specific types of sensors in the agent device. In particular, enclosure 1230 can include a chemical ingress component for the sensors detecting chemical concentrations, an air intake component with a screen mesh, a water resistant air outlet, an optical fiber light pipe, a Wi-Fi antenna 1232, a radio antenna 1234 for the software-defined radio sensors, a solar collector 1236, a window/opening 1238 that enables the visible camera to capture visible images, a Germanium window 1240 that enables the thermal camera to capture thermal images, and an inspection window. As shown in FIG. 12D, antennas 1232 and 1234 and solar collector 1236 can protrude out of the top of the enclosure, for example. The enclosure can further include mounting plates and rails for mounting of various components, and indicators such as an LED power indicator.

It will be appreciated that the specific example of agent device 1200 is provided for illustrative purposes only. Other electric utility use cases may use agent devices with different numbers of sensor clusters, different types of sensors, different combinations of sensors, etc., without departing from the scope of this disclosure. For example, an agent device used in the context of an electric power utility use case can further include sensors for parameters associated with electrical power, such as voltage, current, phase angle, and frequency. In such an example, data from the sensors associated with electrical power can be communicated to a control center using the DNP3 protocol and/or the Message Queuing Telemetry Transport (MQTT) protocol.

In one example, numerous agent devices 1200 (e.g., 80 agent devices) can be deployed in electricity substations of an electric power utility. The agent devices can measure multiple parameters simultaneously. The agent devices can be connected via a network such as a 900 MHz wireless network, and can collect and transfer data to an associated sensor network interface module (e.g., network interface module) periodically (e.g., every two seconds). The sensor network interface module can utilize a wireless-to-fiber optic (singlemode) media converter which allows for the sending of the data to the utility's control center SCADA system via their fiber optic communication network.

Figure 13:
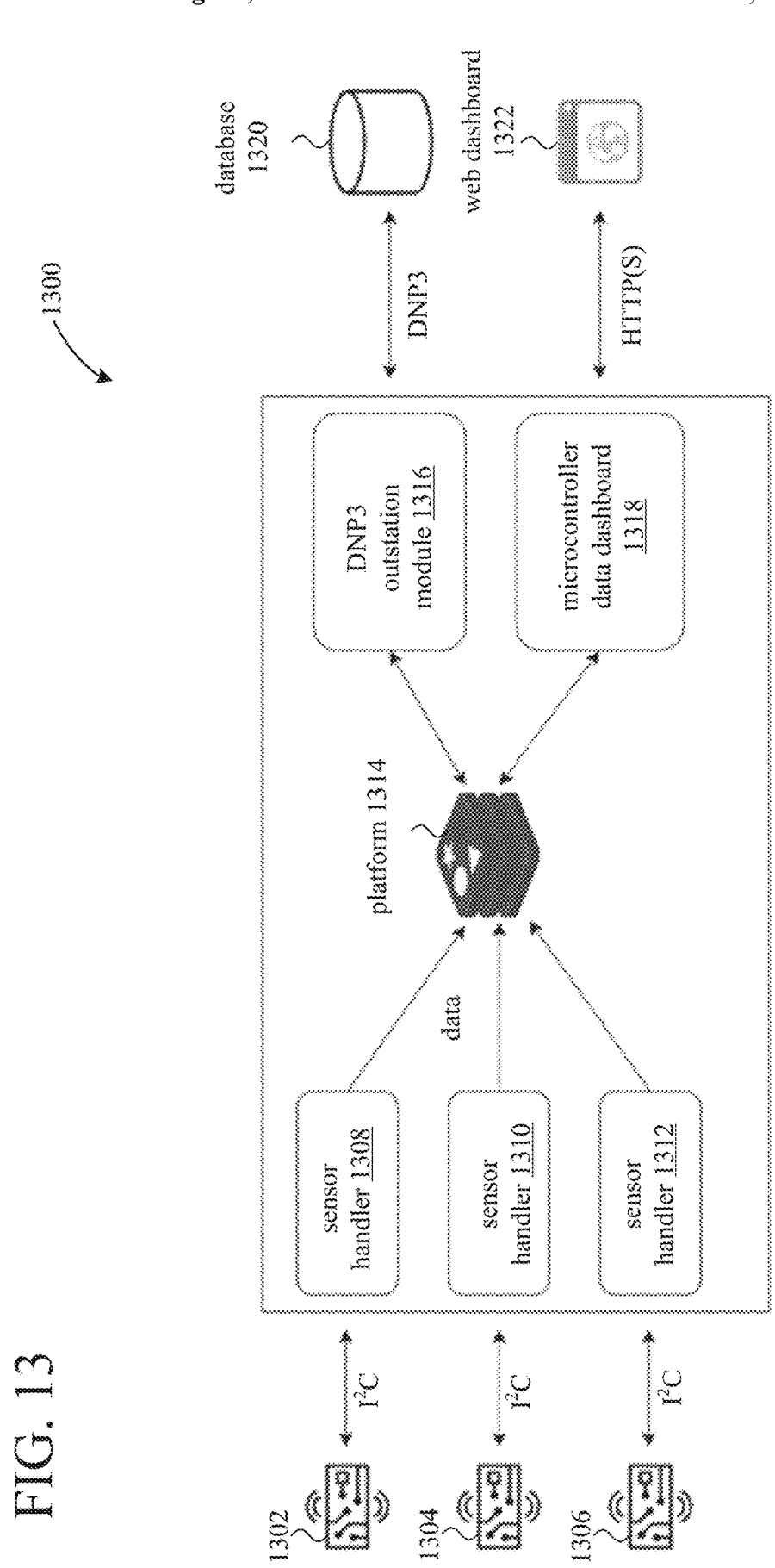
FIG. 13 is a block diagram illustrating an example communication architecture for a multi-sensor agent device, such as the multi-sensor agent device of FIGS. 12A-D.

FIG. 13 is a block diagram illustrating an example communication architecture 1300 for a multi-sensor agent device, such as agent device 1200 of FIGS. 12A-D. Using communication architecture 1300, agent devices can function as IoT devices programmed to respond to IT security applications, such as software probe signals and commands issued by a cyber-intrusion detection system or UTM (e.g., via the use of ICMP and SNMP as well as other responses). In addition, agent devices can use communication architecture 1300 to perform other functions, such as blockchain distributed ledger validation of device authenticity.

Example communication architecture 1300 includes sensor clusters 1302, 1304, and 1306. The agent device can transfer data (e.g., sensor measurements) as messages to a network. For example, after a physical measurement is generated by a sensor of an agent device, an analog-to-digital converter (ADC) of the sensor cluster including the sensor can transform the measurement to a binary output or digital data. The microprocessor of a sensor cluster can then process the data output by the ADC (e.g., using a Python script), and the processed data can be transmitted to a platform 1314 using a protocol such as I$^2$C. For example, sensor handlers 1308, 1310, and 1312 coupled to sensor clusters 1302, 1304, and 1306, respectively, can assist with the transmission of data to platform 1314 using the I$^2$C protocol. Platform 1314 can be a data structure store such as a version of Redis platform, which is an open-source in-memory data structure store configured to serve as a database, cache, and message broker. A publish/subscribe model such as the Pub/Sub messaging paradigm of Redis can be used to facilitate communication between the various modules of communication architecture 1300.

Communication architecture 1300 further includes a DNP3 outstation module 1316, which can be included in communications module 214 of FIG. 2, for example. In some examples, DNP3 is the primary communication protocol used for transferring sensor data. DNP3 outstation module 1316 can be a configurable module that responds to polling from a "master" client, such as a control center, over a first logical channel or first set of logical channels. The sensor data sent through DNP3 can then be transmitted to and stored in a database 1320, which can be a remote terminal unit (RTU) of a SCADA system, for example, over a second logical channel or second set of logical channels. In parallel, the data can be sent to a microcontroller data dashboard 1318, such as the RPi Node-RED live data dashboard. Dashboard 1318 can in turn be accessed by a Web dashboard 1322 via HTTP or HTTPS.

The sensor clusters of a given agent device can be connected to a wireless network that collects and transfers data to a communications module of the agent device periodically, such as every 2 seconds. The communications module can utilize a wireless-to-fiber optic (single-mode) media converter, which allows for the sending of the data to a remote entity, such as SCADA system of a control center, by means of a fiber-optic communication network. The transmission of data within communications architecture 1300 can occur via the first set of logical channels and/or the second set of logical channels discussed above. For example, data related to agent device authentication, sensor activation, sensor deactivation, control of frequency or sensitivity of sensors, or sensor polling can be transmitted via the first set of logical channels, whereas sensor measurement data can be transmitted via the second set of logical channels.

As noted above, the internal communication configuration of each agent device can rely on each sensor cluster microcontroller being IP-addressable with one or more unique IP addresses in a range acceptable by a network engineer into whose network the agent device will communicate.

Communications architecture 1300 can incorporate cyber best practices within the software stack and network communications interfaces associated with the transport of agent device sensor measurements into a DCS/SCADA environment. Specifically, the agent devices can utilize Transport Layer Security (TLS) over a Secure Shell (SSH) protocol transported through an IT-specified VLAN, which can provide a cyber-secure information transport system. For example, sensor alarms/alerts can be transmitted to the SCADA system via the DNP3 protocol. In addition, the alarms/alerts can also be transmitted to the IT department's cybersecurity applications.

Figure 14:
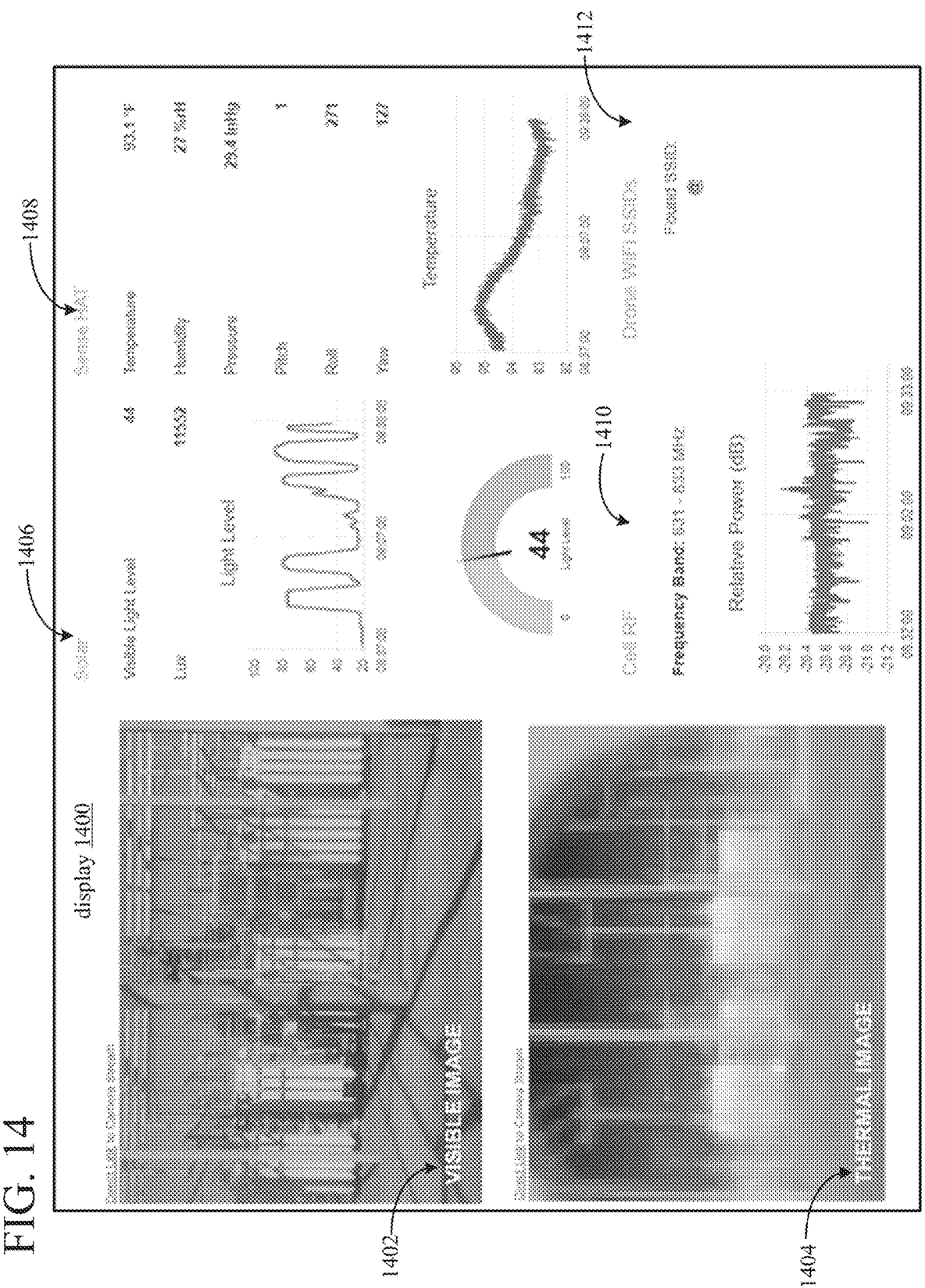
FIG. 14 illustrates an example display of data received from the multi-sensor agent device of FIGS. 12A-D.

FIG. 14 illustrates an example display 1400 visualizing data received from an agent device, such as agent device 1200 of FIGS. 12A-D, in the context of an electric utility use case. Display 1400 is an example of output device 124 of control center 110 shown in FIG. 1. Such displays can provide visualizations of data received from agent devices, and thus the parameter values visualized can vary depending on the sensors included in the agent devices, which sensors of the agent devices are currently activated, etc. In some examples, each sensor cluster microcontroller of an agent device provides sensor data for one or more visualizations. The visualizations can be transmitted, e.g., in the form of a graphical user interface (GUI), to the control center. This can allow for the viewing of measurements by control system operations, independent of the SCADA system. In other examples, the same visualizations can be displayed on a dashboard, such as Web dashboard 1322 of FIG. 13.

In the depicted example, display 1400 includes a visualization 1402 of data from the visible image sensor; a visualization 1404 of data from the thermal image sensor; a visualization 1406 of data from the irradiance sensor; a visualization 1408 of data from RPi Sense Hat sensors; a visualization 1410 of data from the cellphone signal detector; and a visualization 1412 of data from the drone RF detector. In visualization 1406, the solar irradiance information is displayed as a graphic of light intensity over time. In addition, a gauge chart can be used to monitor the absolute value of the light intensity at a particular time. In visualization 1418, measurements of temperature, humidity, pressure, pitch, roll, and yaw are displayed, including a graph of temperature over time. In visualization 1410, a frequency band is indicated, and the relative power of signals in the indicated frequency band measured by the cellphone signal sensor over a period of time are displayed. In visualization 1412, SSIDs found by the drone detector can be displayed.

XI. Mobile Implementations

The agent devices described herein can be modified to operate on a mobile platform. For example, as discussed above with respect to second agent device 104 of FIG. 1, one or more of the agent devices can be transported by a UAS such as a drone, or by another vehicle. The agent devices modified to operate on a mobile platform can optionally be miniaturized versions of stationary agent devices. Utilizing mobile platforms for agent devices can provide a control center with real-time access to data and visualizations from the sensors included in the agent devices, such as video streams from the visible and thermal cameras. In some examples, the mobile platforms can be operated by field crews during a restoration process. Alternatively, the mobile platforms can be remotely controlled by the control center for inspection of the data gathered. For example, after a storm, an agent device on a mobile platform can be operated in a remote operation mode to perform an initial assessment of damages to utility assets. Towards this end, a mobile platform (e.g., drone) can fly an agent device to different transformer poles and transmission lines in the utility's service area to perform inspections.

One non-limiting example of a UAS that can be used as a mobile platform for the agent devices described herein is the DJI Phantom 4 Pro. This commercially-available UAS can be modified to accommodate the housing carrying the sensors, communications module, and power source of an agent device. In such an implementation, the sensors, visible camera, and thermal camera of the agent device can be packaged in a customized 3D-printed box. As the UAS flies over the area of interest, the cameras can be controlled by a microcontroller of the agent device, such as an RPi3, to capture real-time visible and thermal videos of the transformers and distribution lines. The videos can be sent to the control center, for example, via 900 MHz wireless communication connection, to a media-converting interface module of the control center.

XII. Other Example Use Cases

In addition to the electric utility use case described above, various other use cases for the agent devices disclosed herein have been identified. These use cases are described for the sake of example, and are not meant to be limiting.

In one example use case, the agent devices can be used for monitoring of processes, safety, and equipment. Incremental data can add valuable information in making decisions that improve operations, safety and asset performance. However, a limiting factor on obtaining incremental data is the cost of installation, management, and analysis. If these costs were nil, the amount of points of measurement on process, safety, and manufacturing equipment would likely be orders of magnitude greater than best practices today. Deployment of agent devices can limit the costs associated with obtaining such incremental data.

In another example use case, the agent devices can be used for offshore oil platform monitoring. Oil rigs require periodic inspection for corrosion of structural elements of the platform as well as process piping, tanks, and equipment. Currently, health and safety concerns limit the areas, frequency, and detail of inspection of oil rigs. By incorporating the disclosed agent devices on an unmanned aerial system such as a drone, with a physical and logical connection to the drone, inspection of oil rigs can be performed without health and safety risks. The drone and/or the agent device itself can relay information gathered by the agent device back to a central server in a secure area of the platform.

In yet another example use case, the agent devices can be used for monitoring of terrorist threats to assets such as public water supplies. For example, should a credible threat to a public water supply be received, management of the water supply would like to have as much warning as possible to prevent tainted water from entering the system. Currently, water analysis is managed in an ongoing fashion at the entrance to a water plant, at which point contaminated water may have already entered the system. Upon learning of a credible threat, a utility could immediately deploy drones carrying the disclosed agent devices to fly preprogrammed routes to test the water supply. For example, the drones could deploy agent devices including surface acoustic wave or other sensors to pre-determined locations. The drones(s) could then fly a pattern to establish secure communications with sensors located in the water supply, and either relay the data back to the utility network or store the data to be retrieved when the drone is in range of the utility network. Time stamping can assure that the data from multiple sensors and drones is reconstructed in its actual sequence of events. As the sensors in the water supply drift due to wind and currents, the drones can locate the sensors via triangulation, visualization and near field communications, retrieve the sensors, and redeploy them as required. Upon completion of this high alert status, the entire system can be decommissioned, e.g., by the drones retrieving all sensors and returning them to the utility.

Numerous examples are described in this disclosure, and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and can include any combination of special-purpose hardware and/or hardware with software implementing the functionality described herein.

Further, the techniques and tools described herein are not limited to the specific examples described herein. Rather, the respective techniques and tools may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and may actually refrain from exchanging data most of the time. For example, a device in communication with another device via the Internet might not transmit data to the other device for weeks at a time. In addition, devices, components, modules, or structures that are in communication (communicatively coupled) with each other may communicate directly or indirectly through one or more intermediaries.

As used herein, the term "convey," "send" or "output" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps/stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A multi-sensor agent device, comprising:
one or more individually-IP-addressable sensor clusters, the respective sensor clusters comprising a microcontroller and one or more sensors communicatively coupled with the microcontroller of the sensor cluster;
a communications module communicatively coupled with the microcontroller for each of the respective sensor clusters, the communications module being configured to convey network management protocol queries from a control center to the microcontroller for each of the respective sensor clusters via a first set of logical channels, and the communications module being further configured to output data generated by the sensors via a second set of logical channels to the control center, the second set of logical channels being different from the first set of logical channels; and
a power supply electrically coupled with the communications module and with the microcontroller for the respective sensor clusters, wherein, for the respective sensor clusters, the microcontroller is configured to generate an update to a local blockchain ledger that records data generated by the respective sensors of the sensor cluster, wherein the generated data represents measured values of physical parameters, wherein the local blockchain ledger is stored on the multi-sensor agent device, and wherein the data in the local blockchain ledger is communicated to the control center when a time threshold is reached.

2. The agent device of claim 1, wherein the communications module is communicatively coupled with the microcontroller for the respective sensor clusters through a network switch, and wherein, for the respective sensor clusters, the microcontroller of the sensor cluster uses a different one of the first set of logical channels and different one of the second set of logical channels.

3. The agent device of claim 1, wherein the microcontrollers of the respective sensor clusters have different IP addresses.

4. The agent device of claim 1, wherein the one or more sensors of each of the respective sensor clusters comprise at least one of a sensor configured to measure a concentration of a chemical, a sensor configured to measure irradiance, an accelerometer, a magnetometer, a barometer, a thermometer, a sensor configured to measure relative humidity, a sensor configured to measure radio frequency, a thermal imager, a visible imager, a sensor configured to detect tampering, or a geolocation sensor.

5. The agent device of claim 1, wherein, for the respective sensor clusters, the microcontroller is configured to generate responses to the network management protocol queries and the one or more sensors are configured to generate the data representing measured values of physical parameters.

6. The agent device of claim 5, wherein the communications module is configured to convey the responses to the network management protocol queries generated to the control center.

7. The agent device of claim 1, further comprising at least two individually-IP-addressable sensor clusters.

8. An unmanned aerial vehicle comprising the agent device of claim 1.

* * * * *